US007974474B2

(12) United States Patent
Hirohata et al.

(10) Patent No.: US 7,974,474 B2
(45) Date of Patent: Jul. 5, 2011

(54) METHOD FOR MATCHING IMAGES, IMAGE MATCHING DEVICE, IMAGE DATA OUTPUT APPARATUS, AND RECORDING MEDIUM

(75) Inventors: Hitoshi Hirohata, Osaka (JP); Masakazu Ohira, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 265 days.

(21) Appl. No.: 12/432,381

(22) Filed: Apr. 29, 2009

(65) Prior Publication Data

US 2009/0274374 A1 Nov. 5, 2009

(30) Foreign Application Priority Data

May 2, 2008 (JP) ................................ 2008-120256

(51) Int. Cl.
*G06K 9/62* (2006.01)
*H04N 1/40* (2006.01)
*G01C 22/00* (2006.01)

(52) U.S. Cl. .......................... 382/209; 358/448; 701/28

(58) Field of Classification Search .................. 382/100, 382/190, 209, 218, 286, 305; 358/1.9, 3.23, 358/3.28, 448, 462, 530; 701/28; 707/999.005, 707/999.006

See application file for complete search history.

(56) References Cited

U.S. PATENT DOCUMENTS 5,465,353 A * 11/1995 Hull et al. ............................ 1/1
7,072,486 B1 * 7/2006 Akamatsu et al. ............ 382/100
2008/0177764 A1 7/2008 Kise et al.
2009/0080783 A1 3/2009 Hirohata

FOREIGN PATENT DOCUMENTS

JP 06-208368 A 7/1994
JP 7-282088 A 10/1995
JP 2001-197303 A 7/2001
JP 2004-265237 A 9/2004
WO WO-2006/092957 A1 9/2006

OTHER PUBLICATIONS

Nakai et al., "Document Image Retrieval and Removal of Perspective Distortion Based on Voting for Cross-Ratios", Meeting on Image Recognition and Understanding (MIRU 2005), Jul. 2005, pp. 538-545.

* cited by examiner

*Primary Examiner* — Abolfazl Tabtabai
(74) *Attorney, Agent, or Firm* — Birch, Stewart, Kolasch & Birch, LLP

(57) ABSTRACT

An image matching device includes a section calculates feature points on an input document image, a section that calculates features of the input document image in accordance with a relative position between the calculated feature points, and sections for comparing the calculated features of the input document image with features of a reference document image to determine whether the input document image is similar to the reference document image. When it is determined that the input and reference documents are similar, a document discrimination section determines a position of an image on the input document and similar to the reference document image, in accordance with the positions of the coordinates of the feature points on the input document and on the reference document.

8 Claims, 21 Drawing Sheets

FIG. 4
| | | | | | | |
|---|---|---|---|---|---|---|
| −3 | −2 | −1 | 1 | −1 | −2 | −3 |
| −2 | −2 | 1 | 4 | 1 | −2 | −2 |
| −1 | 1 | 8 | 15 | 8 | 1 | −1 |
| 1 | 5 | 16 | 25 | 16 | 5 | 1 |
| −1 | 1 | 8 | 15 | 8 | 1 | −1 |
| −2 | −2 | 1 | 4 | 1 | −2 | −2 |
| −3 | −2 | −1 | 1 | −1 | −2 | −3 |
FIG. 5
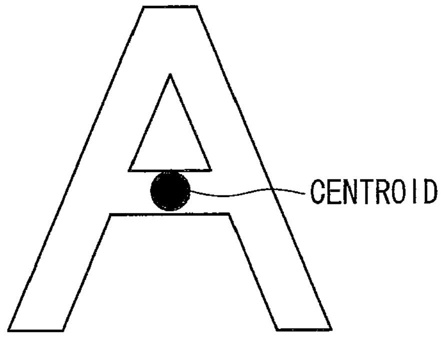
FIG. 6
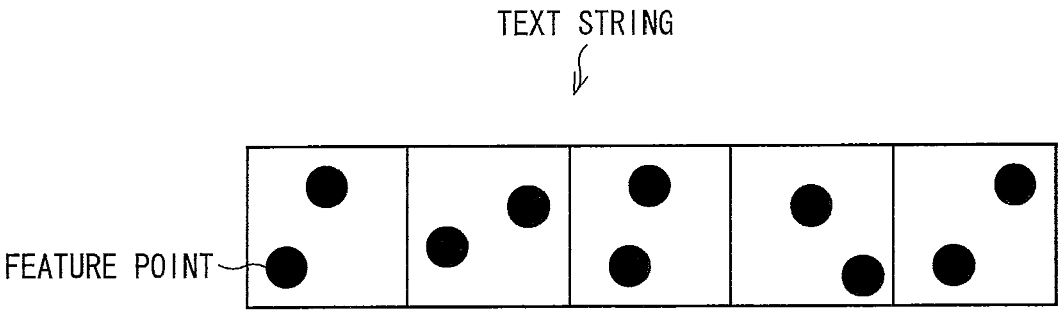

FIG. 11 (a)

| HASH VALUE | INDEX OF REFERENCE DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 11 (b)

| HASH VALUE | INDEX OF REFERENCE DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

FIG. 13

INDEX OF REFERENCE DOCUMENT IMAGE

INDEX OF FEATURE POINT ON REFERENCE DOCUMENT IMAGE

| | ID1 | ID2 | ID3 | ID4 | ··· |
|---|---|---|---|---|---|
| f1 | p1 | | | | |
| f2 | | | p2 | | |
| f3 | p3 | | | | |
| f4 | p4 | | | | |
| f5 | | | | p5 | |
| f6 | | p6 | | | |
| f7 | p7 | | | | |
| ⋮ | ⋮ | ⋮ | ⋮ | ⋮ | |

FIG. 14

| | INDEX OF REFERENCE DOCUMENT IMAGE | | |
|---|---|---|---|
| | ID1 | ID2 | ··· |
| INDEX OF FEATURE POINT ON REFERENCE DOCUMENT IMAGE | COORDINATES | COORDINATES | ··· |
| f1 | $(X_{11}, Y_{11})$ | $(X_{21}, Y_{21})$ | ··· |
| f2 | $(X_{12}, Y_{12})$ | $(X_{22}, Y_{22})$ | ··· |
| f3 | $(X_{13}, Y_{13})$ | $(X_{23}, Y_{23})$ | ··· |
| f4 | $(X_{14}, Y_{14})$ | $(X_{24}, Y_{24})$ | ··· |
| ⋮ | ⋮ | ⋮ | |

FIG. 16

| | COORDINATES OF FEATURE POINT ON REFERENCE DOCUMENT IMAGE | COORDINATES OF FEATURE POINT ON INPUT DOCUMENT IMAGE |
|---|---|---|
| 1 | (x1, y1) | (x1', y1') |
| 2 | (x2, y2) | (x2', y2') |
| 3 | (x3, y3) | (x3', y3') |
| 4 | (x4, y4) | (x4', y4') |

METHOD FOR MATCHING IMAGES, IMAGE MATCHING DEVICE, IMAGE DATA OUTPUT APPARATUS, AND RECORDING MEDIUM

This Nonprovisional application claims priority under 35 U.S.C. §119(a) on Patent Application No. 2008-120256 filed in Japan on May 2, 2008, the entire contents of which are hereby incorporated by reference.

1. Technical Field

The present invention relates to a method for matching images, an image matching device, an image data output apparatus, and a recording medium, each of which relates to image matching whose object is an image (a document image) including a text or a sign.

2. Background Art

There is an image data output apparatus for carrying out an output process, such as copying, data transmission or filing, on inputted image data of an input document. To such an image data output apparatus, a variety of techniques of matching document images for determining similarity between images have been conventionally applied.

As an example of the usage, the following technique is suggested: features of an input document image are extracted from inputted image data of the document image (input document image); the features of the input document image are compared with features of a reference document image which has already been stored, so as to determine similarity between the input document image and the reference document image; and in a case where the input document image and the reference document image are similar, the output process to be carried out on the image data of the input document is restricted or output is controlled by carrying out the process under predetermined conditions.

For determination on similarity between images, the following methods are suggested for example: (i) a method for extracting a keyword from an image by OCR (Optical Character Reader), so as to determine similarity between images from the extracted keyword; (ii) a method for performing determination on similarity to only an image of a ledger sheet with ruled lines, and extracting a feature of the ruled lines, so as to determine similarity between images; (iii) a method for replacing a text string or the like on image data with points and determining a positional relationship between the points (feature points) as features, so as to determine similarity between images; or (iv) the like.

For example, Patent Literature 1 discloses the technique of generating a descriptor from a feature of an inputted image and matching the inputted image with database-stored images by using the descriptor and a descriptor database which records descriptors in association with the images including features from which the descriptors are generated. The descriptor is selected so as to be invariant for distortion produced by image digitalization and for a difference between the input image and the image in the database to be matched therewith.

With this technique, the descriptor database is scanned to vote for each image in the database, in order to accumulate votes and extract one document which obtained the most votes or an image whose number of votes obtained exceeds a certain threshold. The document or image is regarded as an image that matches with the input image, or an image similar to the input image.

Furthermore, Patent Literature 2 discloses the technique such that: a plurality of feature points are extracted from a digital image; sets of local feature points are determined from among the extracted feature points; subsets of feature points are selected from each determined set; an invariant for geometrical transformation is determined on the basis of a plurality of combinations of the feature points in the subset, the invariant being regarded as a value featuring each selected subset; features are calculated based on combination of each determined invariant; and voting is carried out on the images in the database which have the calculated features, so as to search for the image corresponding to the digital image.

However, even if an inputted input document is an N-up (N=2, 4, 6, 8, 9, etc.) document on which multiple pages of document images are combined in one document, a conventional image matching device is not arranged to discriminate whether or not the input document is the N-up document. Consequently, the conventional image matching device carries out discrimination in the same manner as in the case of a normal document.

Therefore, for example, when an image data output apparatus is provided with an image matching device so as to control the output process of the image data of the input document in accordance with a result of discrimination by the image data matching device, the output process cannot be appropriately carried out on each combined document image in a case where the input document is the N-up document.

Specifically, as illustrated in FIG. 24, when A of two document images A and B on a 2-up document is a reference document image, the conventional image matching device cannot discriminate whether or not the input document is the 2-up document, but only determines that the input document image is similar to the reference document image. Therefore, when "prohibition against the output process", for example, is imposed for the reference document image to which the document image A is determined to be similar, the document image B is also prohibited from being subjected to the output process similar to that of the document image A. Therefore, there occurs such a problem that the document image B cannot be printed, either.

Moreover, whether or not the input document is the N-up document can also be discriminated, for example, by determining, from the image data of the input document, distribution of frequencies of reversion (or frequencies of edges) in which a pixel value changes from 0 to 1 and vice versa with respect to each line of the input document image in horizontal and vertical scanning directions. However, this technique requires another function totally different from an image matching process.

Citation List

Patent Literature 1

Japanese Patent Application Publication, Tokukaihei, No. 7-282088 (Publication Date: Oct. 27, 1995)

Patent Literature 2

Pamphlet of International Publication No. 2006-092957 (Publication Date: Sep. 8, 2006)

Non Patent Literature 1

Tomohiro NAKAI, Koichi KISE, Masakazu IWAMURA: "Document Image Retrieval and Removal of Perspective Distortion Based on Voting for Cross-Ratios", Proceedings of Meeting on Image Recognition and Understanding (MIRU 2005) (hosted by Computer Vision and Image Media of Information Processing Society of Japan), page 538-545

SUMMARY OF INVENTION

An object of the present invention is to provide a method for matching images, an image matching device, an image data output apparatus, and a recording medium, each of which can discriminate whether or not an input document is an N-up document in an image matching process.

In order to attain the aforementioned object, the image matching device of the present invention is an image matching device comprising: a feature point calculation section for calculating feature points on an input document image from inputted data of the input document image; a features calculation section for calculating features of the input document image in accordance with a relative position between the feature points calculated by the feature point calculation section; a similarity determination section for determining whether or not the input document image is similar to the reference document image, the similarity determination section performing the determination by comparing (i) the features of the input document image which are calculated by the features calculation section with (ii) features of a reference document image; and a document discrimination section for discriminating whether or not the input document image is an image of an N-up document if the similarity determination section determines that the input document image is similar to the reference document image, the document discrimination section, in accordance with coordinate positions of feature points on the input document image and feature points on the reference document image which coincides with the input document image in features, determining where on the input document image a position of the reference document image is located correspondingly, and the document discrimination section discriminating whether or not the input document image is the image of the N-up document with use of information on where on the input document image the position of the reference document image is located correspondingly.

According to this, between the input document image and the reference document image which are determined to be similar by the similarity determination section, the document discrimination section determines where on the input document image the position of the reference document image is located correspondingly, in accordance with the coordinate positions of the feature points which coincide in features, so as to discriminate whether or not the input document image is the image of the N-up document, that is, whether or not the input document is the N-up document, with use of information on where on the input document image the position of the reference document image is located correspondingly.

In a case of the N-up document on which multiple pages of document images are combined, positions of the combined document images are determined by conditions for combination. Accordingly, a positional relationship between the feature points on the input document image and the feature points on the reference document image which coincides with the input document image in features is determined in accordance with the coordinate positions of the feature points on the input document image and the feature points on the reference document image, so that the position on the coordinates of the input document image of the image similar to the reference document image is determined. Whether or not this determined position matches an image position previously determined by the conditions for combination can discriminate whether or not the input document image is the image of the N-up document.

That is, according to this, with use of a corelationship between the feature point on the input document image and the corresponding feature point on the reference document image determined to be similar to the input document image, and by utilizing the function of the image matching process, whether or not the input document is the N-up document can be discriminated.

Furthermore, data of the input document image is, for example, image data obtained by scanning a document with a scanner or electronic data formed by inputting necessary information on a format of electronic data with use of a computer (software), that is, for example, what is computerized from an image which is printed or written on a sheet or what is directly formed as electronic data (an electronic application form or the like).

In order to attain the aforementioned object, the image data output apparatus of the present invention is an image data output apparatus for carrying out an output process on inputted data of an input document image, comprising: the image matching device of the present invention; and an output process control section for controlling the output process on the data of the input document image in accordance with a result of discrimination by the image matching device, the output process control section performing the output process individually for each combined document image in a case where the input document image is an image of an N-up document.

As already described as an image matching device, the image matching device of the present invention can discriminate whether or not the input document image is the image of the N-up document by utilizing the function of the image matching process. Accordingly, with the image data output apparatus of the present invention provided with such an image matching process, by arranging the output process control section so as to exercise control in accordance with each combined document image when the input document image is the image of the N-up document, the output process suitable for each combined document image can be carried out also when the input document image is the image of the N-up document.

In order to attain the aforementioned object, the image matching method of the present invention is a method for matching images, comprising: (a) calculating feature points on an input document image from inputted data of the input document image; (b) calculating features of the input document image in accordance with a relative position between the feature points calculated by the step (a); (c) determining whether or not the input document image is similar to the reference document image, by comparing (i) the features of the input document image which are calculated by the step (b) with (ii) features of a reference document image; and (d) discriminating whether or not the input document image is an image of an N-up document if it is determined in the step (c) that the input document image is similar to the reference document image, in the step (d), in accordance with coordinate positions of feature points on the input document image and feature points on the reference document image which coincides with the input document image in features, determining where on the input document image a position of the reference document image is located correspondingly, and discriminating whether or not the input document image is the image of the N-up document with use of information on where on the input document image the position of the reference document image is located correspondingly.

As already described as an image matching device, according to the aforementioned arrangement, whether or not the input document image is the image of the N-up document can be discriminated by utilizing the function of the image matching process.

Moreover, the image matching device can be realized by a computer. In this case, by operating a computer as each section mentioned above, a program for realizing the image matching device by a computer and a computer-readable recording medium recording the program are also encompassed in the scope of the present invention.

For a fuller understanding of the nature and advantages of the invention, reference should be made to the ensuing detailed description taken in conjunction with the accompanying drawings.

BRIEF DESCRIPTION OF DRAWINGS

FIG. 4 is an explanatory diagram illustrating filter coefficients of a filter provided in an MTF process section in the feature point calculation section illustrated in FIG. 3.

FIG. 5 is an explanatory diagram illustrating an example of a connected area and a centroid thereof. The connected area is extracted from binarized image data by a process carried out by the feature point calculation section illustrated in FIG. 3.

FIG. 6 is an explanatory diagram illustrating an example of centroids (feature points) of a plurality of connected areas extracted from a text string included in binarized image data by the process carried out by the feature point calculation section illustrated in FIG. 3.

FIG. 9(*a*), illustrating an example of combination of 3 points selectable from the 4 peripheral feature points extracted by the feature point extracting section illustrated in FIG. 8, is an explanatory diagram illustrating an example of combination of the peripheral feature points b, c, and d around the target feature point a. FIG. 9(*b*) is an explanatory diagram illustrating an example of combination of the peripheral feature points b, c, and e around the target feature point a. FIG. 9(*c*) is an explanatory diagram illustrating an example of combination of the peripheral feature points b, d, and e around the target feature point a. FIG. 9(*d*) is an explanatory diagram illustrating an example of combination of the peripheral feature points c, d, and e around the target feature point a.

FIG. 10(*a*) is an explanatory diagram illustrating an example of combination of the peripheral feature points a, e, and f around the target feature point b. FIG. 10(*b*) is an explanatory diagram illustrating an example of combination of the peripheral feature points a, e, and c around the target feature point b. FIG. 10(*c*) is an explanatory diagram illustrating an example of combination of the peripheral feature points a, f, and c around the target feature point b. FIG. 10(*d*) is an explanatory diagram illustrating an example of combination of the peripheral feature points e, f, and c around the target feature point b.

FIG. 11(*a*) and FIG. 11(*b*) are explanatory diagrams illustrating examples of a hash value with respect to each feature point and an index of a reference image, which are stored in a memory in the image matching device illustrated in FIG. 1.

FIG. 13 is an explanatory diagram of a table which is stored in the memory in the image matching device illustrated in FIG. 1 and stores correspondence between feature points on an input document image and feature points on a reference document image which is to be voted.

FIG. 14 is an explanatory diagram of a table which is stored in the memory in the image matching device illustrated in FIG. 1 and illustrates association between indexes f of the feature points on the reference document image and coordinate values with respect to each reference document image.

FIG. 16 is an explanatory diagram illustrating a relationship of correspondence between coordinates of the feature points on the reference document image and coordinates of the feature points on the input document image, both of which are obtained as a result of the positional corresponding operation illustrated in FIG. 15 between the reference document image and the input document image.

DESCRIPTION OF EMBODIMENTS

One embodiment of the present invention is described below with reference to the attached drawings.

Figure 1:
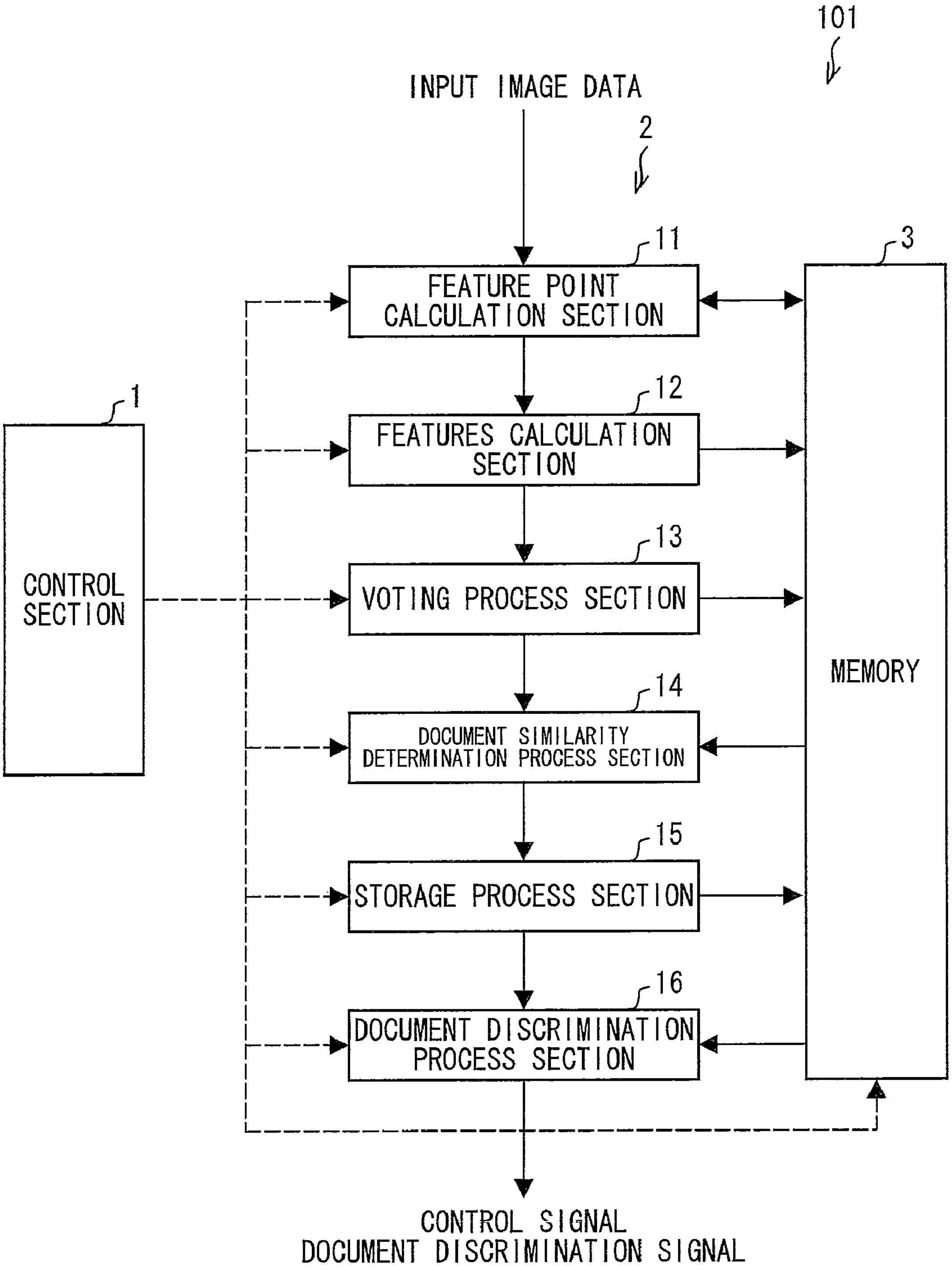
FIG. 1 is a block diagram illustrating a configuration of an image matching device of an embodiment of the present invention.

FIG. 1 is a block diagram illustrating a configuration of an image matching device 101 of the present embodiment. This image matching device 101 is provided in a digital color copying apparatus (image data output apparatus) 102 illustrated in FIG. 2, for example.

A document which is to be processed by the image matching device 101 is not particularly limited, but the image matching device 101 with a function of determining similarity between images is arranged so as to previously store images and determine similarity between the stored images and a document image which is inputted to be processed.

Hereinafter, a stored document image and a source of the document image are referred to as a reference document image and a reference document, respectively. Furthermore, a document image which is inputted for output process (such as copying, fax, or filing) performed by the digital color copying apparatus 102 and compared with the reference document by the image matching device 101 is referred to as an input document image. A source of the document image is referred to as an input document.

The image matching device 101 determines similarity between the reference document image and the input document image which is inputted so as to be processed, and outputs a control signal and a document discrimination signal.

As illustrated in FIG. 1, the image matching device 101 includes a control section 1, a document matching process section 2, and a memory (storage means) 3.

The document matching process section 2 calculates feature points on the input document image from inputted image data of the input document; calculates features of the input document image on the basis of a relative position between the calculated feature points, compares the features of the input document image with features of the stored reference document images; determines similarity between the input document image and the reference images; and outputs the control signal and the document discrimination signal.

Moreover, in the present embodiment, the document matching process section 2 is also provided with a function of storing a document image. During a storage process, image data of the inputted document is stored as the reference document image.

Specifically, the document matching process section 2 includes a feature point calculation section 11, a features calculation section 12, a voting process section 13, a similarity determination process section (similarity determination section) 14, a storage process section 15, and a document discrimination section (document discrimination section) 16.

When image data of the input document and the reference documents are inputted, the feature point calculation section 11 extracts a connected section of a text string or of a ruled line from the input image data and calculates a centroid of the connected section as a feature point. In the present embodiment, the feature point calculation section 11 also calculates coordinates of each feature point.

By using the feature points calculated by the feature point calculation section 11, the features calculation section 12 calculates values which are invariant despite rotation, enlargement or reduction, that is, the features (hash values) which is an invariant parameter being invariant despite geometrical change, such as rotation, translation, enlargement or reduction of the document image (input document image, reference document image). In order to calculate the features (feature vectors), feature points in the vicinity of a target feature point is selected and used.

During a matching process, the voting process section 13 votes for the reference document images stored in a hash table described later. For the voting process, the voting process section 13 uses the hash values calculated by the features calculation section 12 with respect to each feature point calculated by the feature point calculation section 11 from the image data of the input document. The voting process section 13 votes for the reference document images which have the same hash values as the image data of the input document. Furthermore, the voting process section 13, during a voting process, stores which feature points on the input document image voted for which feature points on which reference document image. This will be described later in details.

In accordance with a result of the voting process by the voting process section 13, the similarity determination section 14 determines whether or not the input document image is similar to the reference document image. The similarity determination section 14, in accordance with a result of the determination, outputs the control signal in accordance with the result of the determination.

During the storage process, the storage process section 15 stores therein an ID which is index information for identifying the reference document images in accordance with the hash values calculated by the features calculation section 12 with respect to each feature point calculated by the feature point calculation section 11 from the image data of the reference document.

Moreover, in the document matching process section 2, the voting process section 13 and the similarity determination section 14 carry out their processes during the matching process, but does not carry out their processes during the storage process. On the other hand, the storage process section 15 carries out its process at during the storage process, but does not carry out its process during the matching process.

When the similarity determination section 14 determines that the input document image is similar to the reference document image, the document discrimination process section 16 determines a position of the reference document image on the input document image in accordance with coordinate positions of the feature points on the input document image and the feature points on the reference document image which coincides with the input document image in features. Then, by using information on the positions, the document discrimination process section 16 determines whether or not the input document image is an image of an N-up document. The document discrimination process section 16 outputs the document discrimination signal indicating whether or not the input document image is the N-up document image in accordance with a result of the determination.

The control section (CPU) 1 controls access to the aforementioned sections and the memory 3 which are in the image matching device 101. Furthermore, the memory 3 serves as a working memory on which the aforementioned sections in the image matching device 101 carry out their processes. Moreover, by the storage process, various pieces of information, such as an ID indicating the reference document image are stored in the memory 3.

Figure 3:
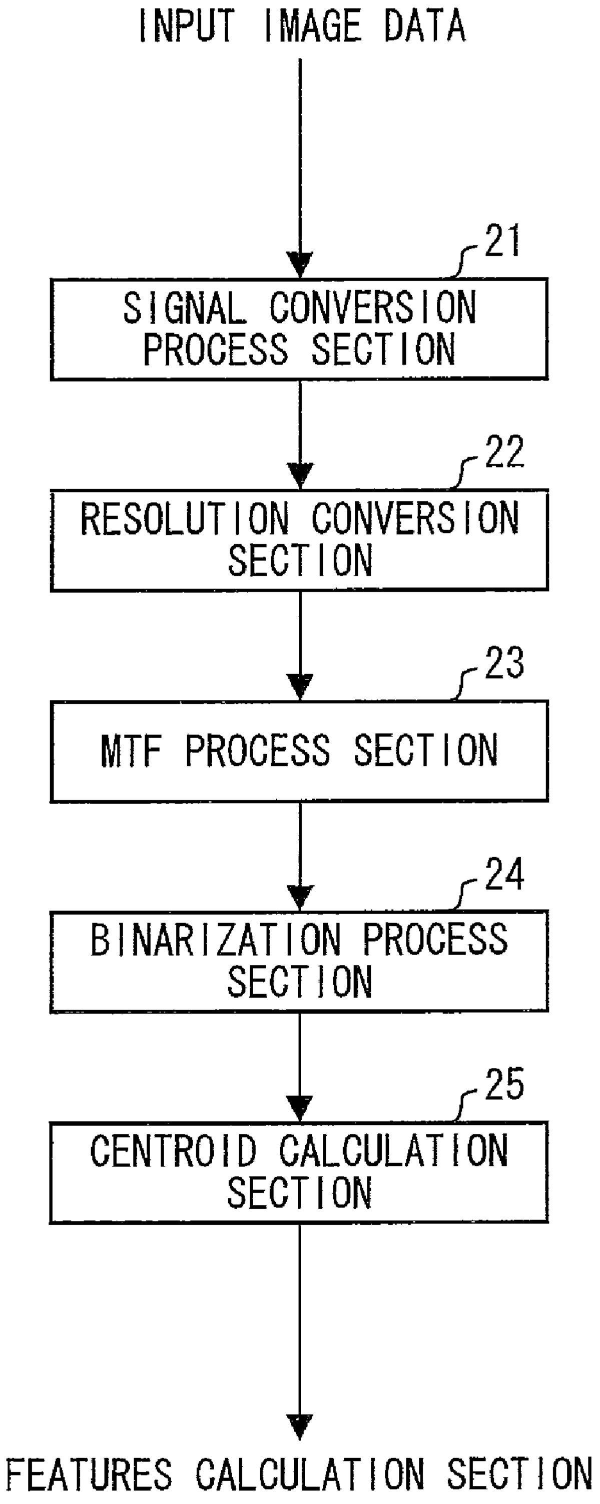
FIG. 3 is a block diagram illustrating a configuration of a feature point calculation section in the image matching device illustrated in FIG. 1.

The document matching process section 2 in the image matching device 101 is specifically described below with reference to the drawings. As illustrated in FIG. 3, the feature point calculation section 11 in the document matching process section 2 includes a signal conversion section 21, a resolution conversion section 22, an MTF process section 23, a binarization process section 24, and a centroid calculation section 25. FIG. 3 is a block diagram illustrating a configuration of the feature point calculation section 11.

In a case where the input image data which is the image data of the reference document, the input document, or the like is a color image, the signal conversion section 21 acromatizes and converts the input image data to a brightness or luminance signal. For example, luminance Y is obtained according to the following equation.

$$Y_j=0.30R_j+0.59G_j+0.11B_j$$

$Y_j$: luminance value of each pixel, $R_j$, $G_j$, $B_j$: color component of each pixel Furthermore, a process for acromatizing and converting the input image data to the brightness or luminance signal need not be carried out by a method according to the aforementioned equation, but may be carried out by converting an RGB signal to a CIE1976L*a*b*signal (CIE: Commission International de l'Eclairage, L*: luminance index, a*, b*: chromaticity index).

In a case where the input image data is optically enlarged or reduced by an image input device, the resolution conversion section 22 enlarges or reduces the input image data again so as to set the resolution of the input image data to predetermined resolution. The image input device is, for example, a scanner for scanning an image of a document so as to convert the image to image data. In the digital color copying apparatus 102 illustrated in FIG. 2, a color image input apparatus 111 corresponds to the image input device.

Moreover, in order to reduce throughput at subsequent stages, the resolution conversion section 22 is also used as a resolution conversion section so as to set resolution to be lower than resolution scanned by the image input device at a setting without enlarging/reducing. For example, image data scanned at 600 dpi (dot per inch) is converted to image data of 300 dpi.

The MTF process section 23 is used to absorb an influence caused due to dependency of a spatial frequency characteristic of the image input device on a type of image input device. That is, in an image signal outputted by a CCD included in the image input device, MTF is deteriorated. The deterioration is caused by an aperture ratio of a light-receiving surface, transfer efficiency, a lingering image, an integral effect by physical scanning, uneven operation, or the like of an optical component, such as a lens or a mirror or of the CCD. Such deterioration in MTF makes the scanned image blurred. Therefore, the MTF process section 23 restores the blur caused by the deterioration in MTF by carrying out an appropriate filter process (enhancement process). Furthermore, the filter process is carried out also to suppress a high-frequency component unnecessary for a process to be carried out by a feature point extraction section 31 in the features calculation section 12 at a subsequent stage. That is, with use of the above-mentioned filter, enhancement and smoothing processes are carried out. Moreover, examples of a filter coefficient of this filter are shown in FIG. 4.

The binarization process section 24 compares a luminance value (luminance signal) or a brightness value (brightness signal) of the image data achromatized by the signal conversion section 21 with a threshold, thereby to binarize the image data and store this binarized image data (binarized image data of the reference document image and the input document image) in the memory 3.

The centroid calculation section 25 labels (carries out a labeling process on) each pixel of the image data binarized by the binarization process section 24 (e.g., image data indicated by "1" or "0"). In this labeling, pixels indicating the same value out of the two values are labeled with the same label. Next, a connected area constituted by a plurality of pixels formed by connecting pixels to which the same label is given is determined. Subsequently, a centroid of the determined connected area is extracted as a feature point. Then, the extracted feature point is outputted to the features calculation section 12. Here, the feature point can be represented by a coordinate value (x-coordinate, y-coordinate) on a binarized image, and the coordinate value of the feature point is also calculated and then outputted to the features calculation section 12.

FIG. 5, which is an explanatory diagram illustrating an example of the connected area extracted from the binarized image data and the centroid of this connected area, illustrates a connected area corresponding to a text "A" and a centroid (feature point) of the connected area. Furthermore, FIG. 6 is an explanatory diagram illustrating an example of centroids (feature points) of a plurality of connected areas extracted from a text string included in the binarized image data.

Figure 7:
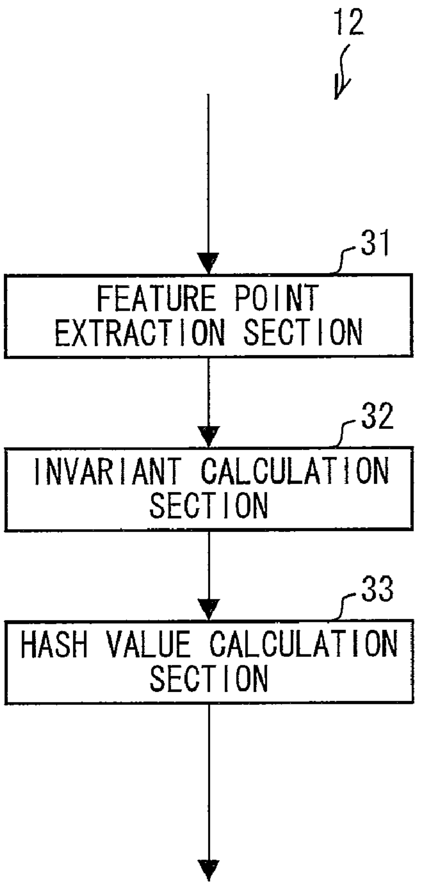
FIG. 7 is a block diagram illustrating a configuration of the feature point calculation section in the image matching device illustrated in FIG. 1.

As illustrated in FIG. 7, the features calculation section 12 includes the feature point extraction section 31, an invariant calculation section 32, and a hash value calculation section 33. FIG. 7 is a block diagram illustrating a configuration of the features calculation section 12.

In a case where there are a plurality of feature points calculated by the feature point calculation section 11 on the image data, the feature point extraction section 31 sets one feature point to a target feature point so as to extract, as peripheral feature points, a predetermined number of feature points on a periphery of and nearest to the target feature point. In an example illustrated in FIG. 8, the predetermined number is set to 4. In a case where the feature point a is set to the target feature point, the feature points b, c, d, and e are extracted as the peripheral feature points. In a case where the feature point b is set to the target feature point, the feature points a, c, e, and f are extracted as the peripheral feature points.

Figure 8:
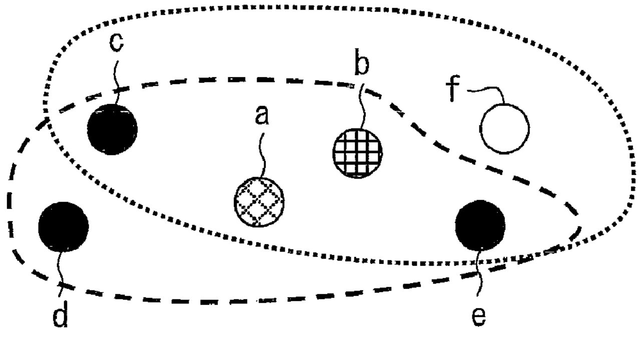
FIG. 8 is an explanatory diagram illustrating operation of extracting peripheral feature points around a target feature point by a feature point extracting section in the feature point calculation section illustrated in FIG. 7.
Figure 9:
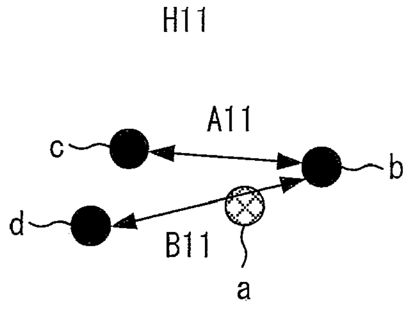
Figure 9:
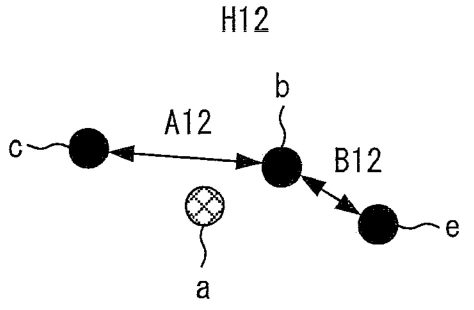
Figure 9:
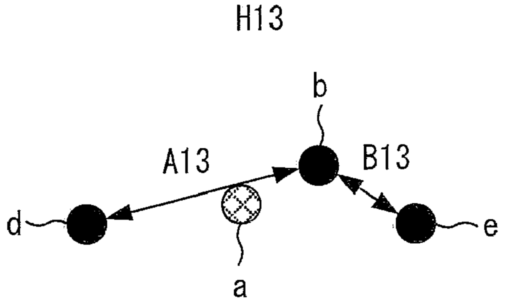
Figure 9:
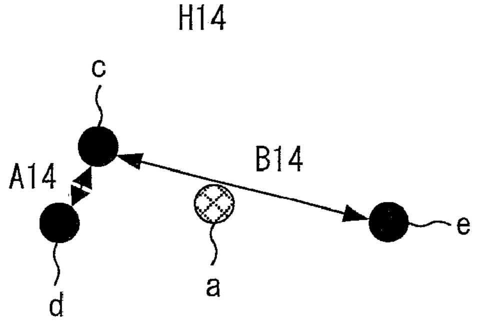
Figure 10:
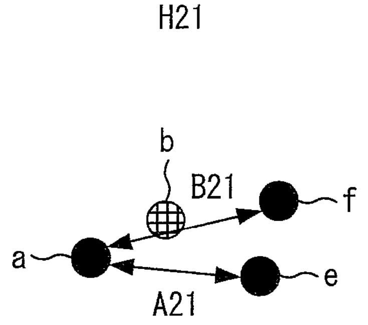
FIG. 10(*a*) to FIG. 10(*d*) are explanatory diagrams illustrating examples of combination of 3 selectable peripheral feature points when one of the 4 peripheral feature points is extracted by the feature point extracting section illustrated in FIG. 8 becomes a target feature point in replacement of an existing target feature point.
Figure 10:
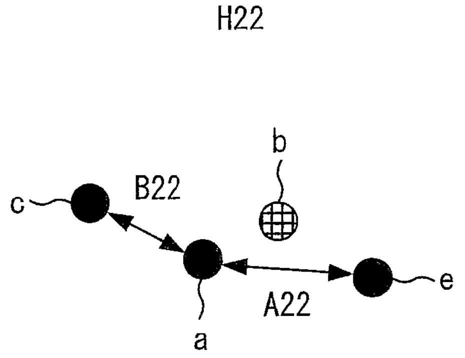
Figure 10:
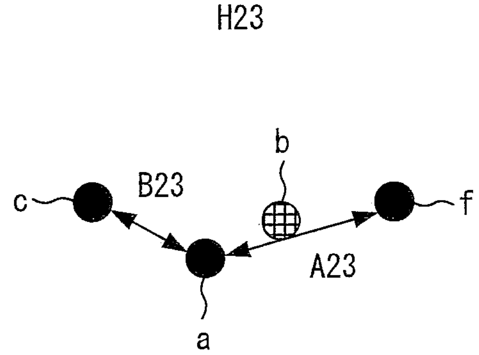
Figure 10:
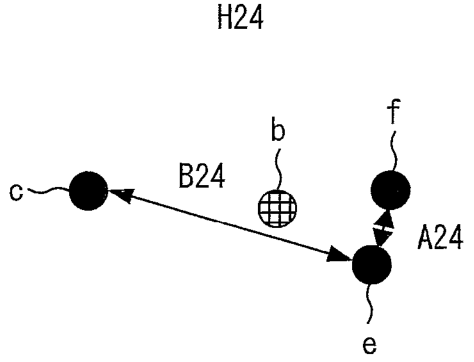

Furthermore, the feature point extraction section 31 extracts a combination of 3 points selectable from the 4 peripheral feature points extracted as above. For example, as illustrated in FIGS. 9(*a*) to 9(*d*), in a case where the feature point a illustrated in FIG. 8 is set to the target feature point, extracted is a combination of 3 points out of the peripheral feature points b, c, d, and e, that is, (i) a combination of the peripheral feature points b, c, and d, (ii) a combination of the peripheral feature points b, c, and e, (iii) a combination of the peripheral feature points b, d, and e, or (iv) a combination of the peripheral feature points c, d, and e.

With respect to each combination extracted by the feature point extraction section 31, the invariant calculation section 32 calculates Hij (one of the features) which is an invariant for geometrical transformation.

Here, i and j are a value indicating the target feature point (i is an integer, not less than 1) and a value indicating a combination of three peripheral feature points (j is an integer, not less than 1), respectively. In the present embodiment, a ratio between two line segments out of the line segments connecting the peripheral feature points is set to the invariant Hij.

A length of the line segment is computable in accordance with a coordinate value of each peripheral feature point. For example, in an example of FIG. 9(a), in a case where a length of a line segment connecting the feature points b and c and a length of a line segment connecting the feature points b and d are set to A11 and B11, respectively, the invariant H11 is expressed by an equation: H11=A11/B11. Moreover, in an example of FIG. 9(b), in a case where a length of a line segment connecting the feature points b and c and a length of a line segment connecting the feature points b and e are set to A12 and B12, respectively, the invariant H12 is expressed by an equation: H12=A12/B12. Furthermore, in an example of FIG. 9(c), in a case where a length of a line segment connecting the feature points b and d and a length of a line segment connecting the feature points b and e are set to A13 and B13, respectively, the invariant H13 is represented by an equation: H13=A13/B13. Further, in an example of FIG. 9(d), in a case where a length of a line segment connecting the feature points c and d and a length of a line segment connecting the feature points c and e are set to A14 and B14, respectively, the invariant H14 is represented by an equation: H14=A14/B14. In this way, in the examples of FIGS. 9(a) to 9(d), the invariants H11, H12, H13, and H14 are calculated.

Moreover, (i) a line segment connecting the peripheral feature points which are the nearest and the second nearest to the target feature point and (ii) a line segment connecting the peripheral feature points which are the third nearest and the nearest to the target feature point are set to Aij and Bij, respectively, but a method for selecting a line segment is not limited to this. A line segment used for calculating the invariant Hij may be selected in an arbitrary manner.

The hash value calculation section 33 calculates a remainder value in the following equation as a hash value (one of the features) Hi.

$$Hi=(Hi1\times10^3+Hi2\times10^2+Hi3\times10^1+Hi4\times10^0)/D.$$

Then, the hash value calculation section 33 stores the obtained hash value in a memory 8. Furthermore, the D is a constant which is predetermined in accordance with to what extent a range of the possible remainder value is set.

A method for calculating the invariant Hij is not particularly limited. For example, a value calculated in accordance with: (i) a compound ratio of 5 points in the vicinity of the target feature point, (ii) a compound ratio of 5 points extracted from n points in the vicinity (n is an integer, $n\geqq5$), (iii) disposition of m points extracted from n points in the vicinity (m is an integer, $m<n$ and $m\geqq5$), or (iv) a compound ratio of 5 points extracted from m points may be set as the invariant Hij with respect to the target feature point. Moreover, the compound ratio is a value determined from 4 points on a straight line or 5 points on a plane. The compound ratio is known as an invariant for perspective transform which is one kind of geometrical transformation.

Furthermore, as for an equation for calculating the hash value Hi, it is not limited to the aforementioned equation, but another hash function (for example, any of the hash functions described in Patent Literature 2) may be used.

After finishing extracting peripheral feature points around one target feature point and calculating their hash values Hi, each section in the features calculation section 12 shifts the target feature point to another feature point, so as to extract peripheral feature points around the another feature point and to calculate their hash values, and thereafter calculates hash values with respect to all the feature points.

In the example of FIG. 8, after extraction of the peripheral feature points and their hash values in a case where the feature point a is set to the target feature point is finished, extraction of the peripheral feature points and their hash values in a case where the feature point b is set to the target feature point is carried out. Moreover, in the example of FIG. 8, in a case where the feature point b is set to the target feature point, the feature points a, c, e, and f are extracted as the peripheral feature points.

Then, as illustrated in FIGS. 10(a) to 10(d), combinations of 3 points selected from these peripheral feature points a, c, e, and f ((i) peripheral feature points a, e, and f, (ii) peripheral feature points a, e, and c, (iii) peripheral feature points a, f, and c, or (iv) peripheral feature points e, f, and c) are extracted and the hash values Hi with respect to the combinations are calculated to be stored in the memory 3. Thereafter, this process is repeated with respect to each feature point and each hash value in a case where each feature point is set to the target feature point is individually determined so as to be stored in the memory 3.

Furthermore, when the storage process is carried out, the features calculation section 12 sends, to the storage process section 15, the hash values (features) calculated as above with respect to the feature points on the input image data (reference document image data).

The storage process section 15 sequentially stores the hash values calculated by the features calculation section 12 with respect to each feature point and IDs for identifying the reference document images of the input document data in the hash table (not illustrated) provided in the memory 3 (refer to FIG. 11(a)). When a hash value has already been stored, an ID is stored so as to correspond to the hash value. Numbers are sequentially assigned to the IDs so as not to be assigned in duplicate.

Moreover, in a case where the number of the reference document images stored in the hash table exceeds a predetermined value (e.g., 80% of the number of storable document images), an old ID may be searched out to be sequentially deleted. Furthermore, it may be arranged such that the deleted ID is usable as an ID of a new reference document image. Further, in a case where calculated hash values are the same (in an example of FIG. 11(b), H1=H5), these calculated hash values being combined in one may be stored in the hash table.

Furthermore, when the matching process is carried out, the features calculation section 12 sends, to the voting process section 13, the hash values calculated as above with respect to each feature point on the input image data (input document image data).

Figure 12:
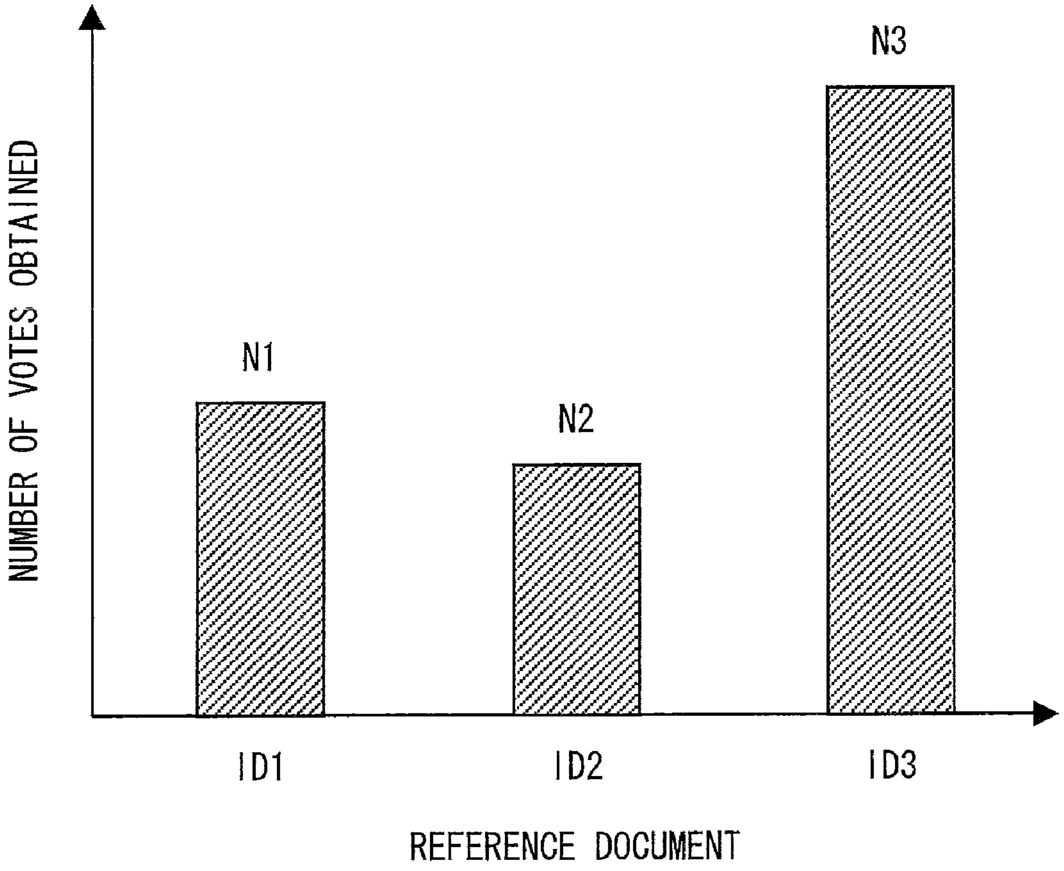
FIG. 12 is a graph illustrating an example of a result of voting by a voting process section in the image matching device illustrated in FIG. 1.

The voting process section 13 compares the hash values calculated from the input image data with respect to each feature point with the hash values stored in the hash table, so as to vote for the reference document image having the same hash value as the feature point (refer to FIG. 12). FIG. 12 is a graph illustrating an example of the number of votes obtained for 3 reference document images ID1, ID2, and ID3. In other words, the voting process section 13, with respect to each reference document image, counts the number of times in which the same hash value as the hash value of the reference document image is calculated from the input image data. The count is stored in the memory 3.

Moreover, in the example of FIG. 11(b), H1=H5. These hash values combined in one hash value H1 are stored in the hash table. For such a table value, in a case where the hash values of the input image which are calculated from the input image data include Hi, the reference document image ID1 obtains 2 votes.

Then, at this time, the voting process section 13 uses the feature points on the input document image and the feature points on the reference document image which coincides with the input document image in hash values, so as to determine the positional relationship between the feature points of both the input document image and the reference document image.

That is, the feature points of the input document image and the feature points of the reference document image are positionally corresponded. Thereafter, as illustrated in FIG. 13, which feature points on the input document image voted for which feature points on which reference document image is stored. Here, p (p1, p2, p3, . . . ) and f (f1, f2, f3, . . . ) are information on an index of each feature point on the input document image and information on an index of each feature point on the reference document image, respectively.

Furthermore, as illustrated in FIG. 14, the f indicating each feature point on the reference document image and coordinates on each reference document image are previously stored so as to carry out the matching process also for the coordinate position.

In an example of FIG. 13, it is determined that the features (hash values) determined for the feature point p1 on the input document image coincide with the features of the feature point f1 on the reference document image ID1 and that the features (hash values) determined for the feature point p2 on the input document image coincide with the features of the feature point f2 on the reference document image ID3. (This technical feature is described in Non-Patent Literature 1).

The document similarity determination process section 14 extracts an ID and the number of votes obtained of the reference document image which obtained the most votes from a result of the voting process carried out by the voting process section 13, so as to compare the extracted number of votes obtained with a predetermined threshold, thereby to calculate similarity therebetween, or so as to divide the extracted number of votes obtained by the maximum number of votes obtained of the document for normalization and then to compare a result of the normalization with a predetermined threshold. As an example of a threshold in this case, a method for setting the threshold to not less than 0.8, can be taken, for example. When a handwriting part is included in the document, the number of votes may exceed the maximum number of votes obtained. Therefore, similarity can also be more than 1.

The maximum number of votes obtained is represented by the number of feature points × the number of hash values calculated from one feature point (target feature point). In the aforementioned examples of FIG. 9(*a*) to FIG. 9(*d*) and FIG. 10(*a*) to FIG. 10(*d*), as the simplest example, the example in which one hash value is calculated from one feature point. However, when a method for selecting a feature point on the periphery of the target feature point is changed, a plurality of hash values can be calculated from one feature point. For example, when 6 points are extracted as the feature points on the periphery of the target feature point, there are 6 combinations of extraction of 5 points from these 6 points. Furthermore, with respect to each of these 6 combinations, a method for extracting 3 points from 5 points so as to determine an invariant, thereby to calculate a hash value.

The document similarity determination process section 14 outputs the control signal in accordance with a result of determination. The control signal is for controlling the output process carried out by the digital color copying apparatus 102 on the image data of the input document. When the image matching device 101 of the present embodiment determines that the input document image is similar to the reference document image, the image matching device 101 outputs the control signal in accordance with restrictions imposed for the reference document image, so as to carry out the output process on the image data of the input document. In a case of the color copying apparatus 102, copying is prohibited or copying is carried out with an image quality compulsorily degraded. Moreover, when the input document image is not similar to the reference document image, the control signal "0" is outputted.

When the similarity determination section 14 determines as mentioned above that the input document image is similar to the reference document image, the document discrimination process section 16 determines a position of the reference document image on the input document image in accordance with the coordinate positions of the feature points on the input document image and the feature points on the reference document image which coincides with the input document image in features and use information on the position, so as to determine whether or not the input document image is the image of the N-up document.

In the present embodiment, the document discrimination process section 16 includes a coefficient calculation section and an N-up document determination section which is described later. When the similarity determination section 14 determines that the input document image is similar to the reference document image, the coefficient calculation section calculates a coefficient indicating the positional relationship between the feature points on the input document image and the feature points on the reference document image in accordance with the coordinate positions of the feature points on the input document image and the feature points on the reference document image which coincides with the input document image in features.

The coefficient calculation section determines a coefficient indicating the positional relationship between the feature points on the input document image and the feature points on the reference document image from the coordinate position of the features points which is determined by the voting process section 13. Here, how to determine the aforementioned coefficient is described.

In order to grasp a correspondence relationship between the feature points on the input document image and the feature points on the reference document image, the coefficient calculation section transforms a coordinate system of the scanned input document image into a coordinate system of the reference document image in order to positionally corresponding them. Specifically, the coefficient calculation section first takes a correspondence between the coordinates of the feature points on the reference document image and the coordinates on the feature points on the scanned input document image, the feature points coinciding in features (hash values), in accordance with the results of FIGS. 13 and 14.

Figure 15:
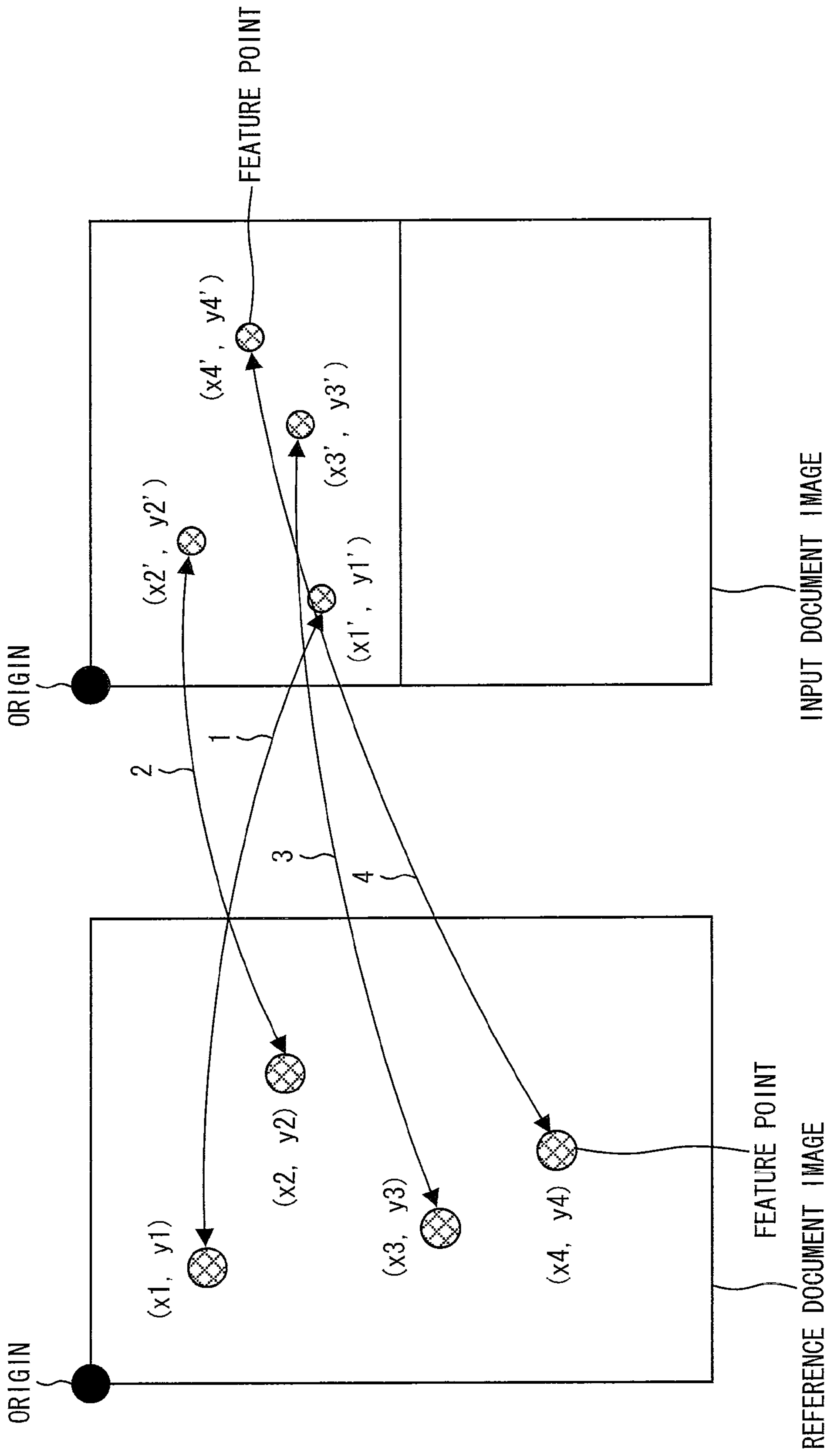
FIG. 15 is an explanatory diagram of operation of positionally corresponding the reference document image and the input document image on the basis of the feature points on the reference document image and the feature points on the input document image which feature points coincide in features (hash values).

FIG. 15 is an explanatory diagram of positional corresponding operation for the reference document image and the input document image in accordance with the feature points on the reference document image and the feature points on the input document image which coincides with the reference document image in features (hash values). FIG. 16 is an explanatory diagram illustrating a correspondence relationship between the coordinates of the feature points on the reference document image and the coordinates of the feature points on the input document image, which is obtained as a result of the positional corresponding operation for the reference document image and the input document image. The examples of FIGS. 15 and 16 illustrate a case in which there are 4 feature points which coincide in features (hash values) between the reference document image and the input document image.

Next, by designating a matrix with respect to the coordinates of the feature points on the reference image, a matrix with respect to the coordinates of the feature points on the input document image, and a transformation coefficient as Pin, Pout, and A, respectively, the coefficient calculation section calculates the transformation coefficient A with the following equations.

$$Pin = \begin{pmatrix} x1. & y1 & 1 \\ x2 & y2 & 1 \\ x3 & y3 & 1 \\ x4 & y4 & 1 \end{pmatrix},$$

$$Pout = \begin{pmatrix} x1' & y1' & 1 \\ x2' & y2' & 1 \\ x3' & y3' & 1 \\ x4' & y4' & 1 \end{pmatrix},$$

$$A = \begin{pmatrix} a & b & c \\ d & e & f \\ g & h & i \end{pmatrix}$$

$$Pout = Pin \times A$$

Here, Pin is not a square matrix. Therefore, as the following equations, both sides of the above equation are multiplied by a transposed matrix $Pin^T$ and further multiplied by an inverse matrix of $Pin^T$ Pin.

$$Pin^T Pout = Pin^T Pin \times A$$

$$(Pin^T Pin)^{-1} Pin^T Pout = A$$

Next, the transformation coefficient A thus obtained is used so as to calculate the coordinate position of the input document image. In this case, as illustrated in the following equation, arbitrary coordinates (x,y) on the reference document image are transformed into coordinates (x',y') on the input document image with use of the transformation coefficient A.

$$(x,y,1)=(x',y',1)\times A$$

The N-up document determination section uses the transformation coefficient A calculated in the coefficient calculation section so as to transform coordinates of reference points on the reference document image into coordinates of the input document image. In a case where the coordinate values of the transformed reference points meet predetermined requirements, the input document image is determined to be the image of the N-up document.

The N-up document determination section uses the transformation coefficient A so as to transform coordinates at four corners of the reference document image into coordinates of the input document image, and carries out a threshold process on the coordinate position after the transformation so as to determine whether or not the input document is the N-up document, thereafter outputting the document discrimination signal indicating whether or not the input document is the N-up document. In a case where the input document is the N-up document, information indicating a position of an image of a part which is on the input document image and similar to the reference document image is also outputted with the document discrimination signal.

Here, the process for carrying out the threshold process so as to discriminate whether or not the input document is the N-up document is described with specific examples. A size of the reference document, an area of an effective image region, and resolution are set to A4 (210 mm×297 mm), 190 mm×257 mm, and 600 dpi (number of pixels: 4488×6070), respectively. It should be noted that the size of the reference document image, which is the size in terms of the image data in which the reference document is scanned, is the same as the size of the reference document.

Figure 17:
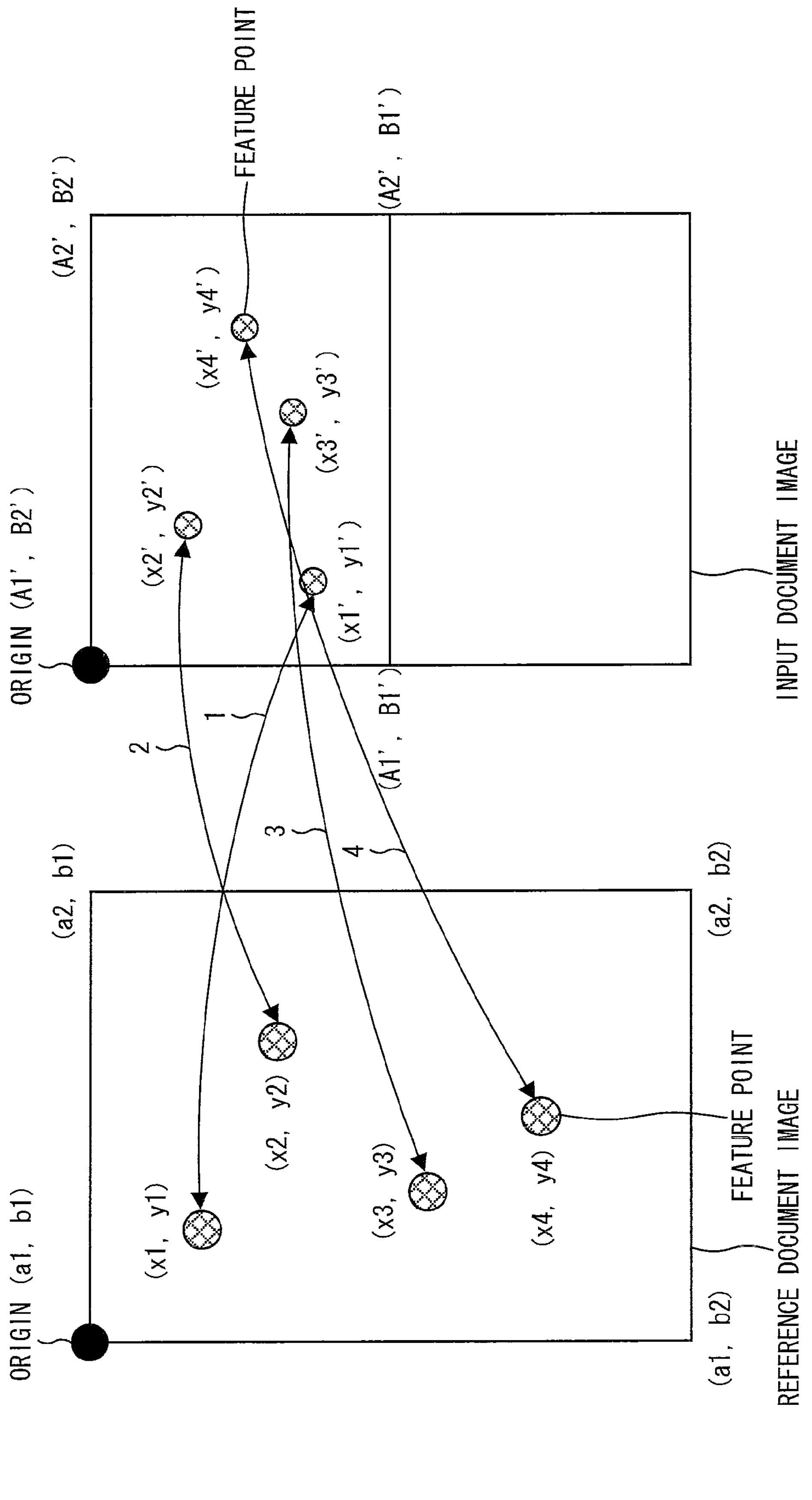
FIG. 17 is an explanatory diagram illustrating an image in which coordinates at four corners of the reference document image are transformed into coordinates on the input document image with use of a transformation coefficient determined by a positional relationship between the feature points which coincide in features (hash values), when the reference document image is similar to one of document images on a 2-up input document.

1) As illustrated in FIG. 17, when coordinates at four corners of the reference document image and coordinates at four corners after transformation (coordinates on the input document) are set to (a1,b1), (a2,b1), (a1,b2), (a2,b2) and (A1',B1'), (A1',B2'), (A2',B1'), (A2',B2'), respectively, and the coordinates after transformation satisfies the following expressions:

$$-224 \leqq A1' \leqq 224,\ 3205 \leqq B1' \leqq 3811,$$

$$4736 \leqq A2' \leqq 5184,\ -303 \leqq B1' \leqq 303,$$

the document discrimination process section 16 determines that the input document image is an image of a 2-Up document. It should be noted that a position on the input document image, where there is an image similar to the reference document image, is determined by the coordinates at four corners after transformation.

The aforementioned values are determined based on a size of the document image (document size). That is, in a case where the area of the effective image region is 190 mm×257 mm, (number of pixels: 4488×6070 (600 dpi)), the number of pixels on the whole document image is 4960×7016. Accordingly, in a case where (A1',B2') which is at the upper left of the document image is set to the origin (0, 0), (A1',B1')=(0,7016/2), (A2',B1')=(4960, 7016/2), and (A2',B2')=(4960, 0). For these values, there is set a coordinate fluctuation margin as a margin of ±5% of the number of pixels on the effective image region in horizontal and vertical directions.

Figure 18:
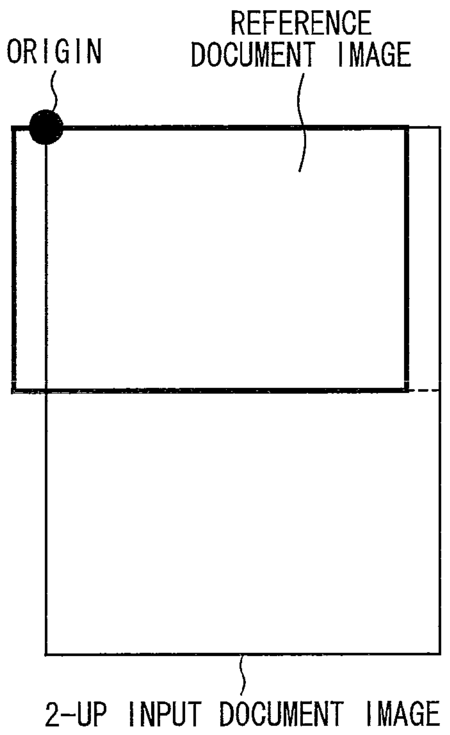
FIGS. 18(*a*) to 18(*d*) are all explanatory diagrams schematically illustrating displacement in case where a reference document image which is similar to one of the document images on the 2-up input document image is transformed into coordinates on the input document image according to the transformation coefficient determined by the positions of the feature points which coincide in features (hash values).
Figure 18:
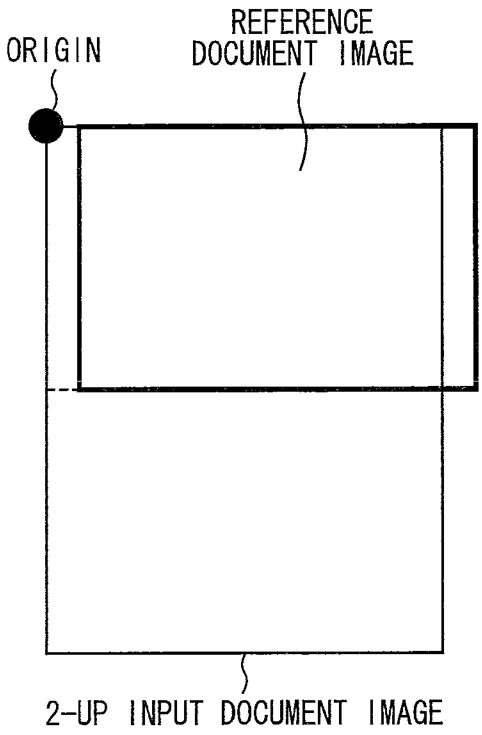
Figure 18:
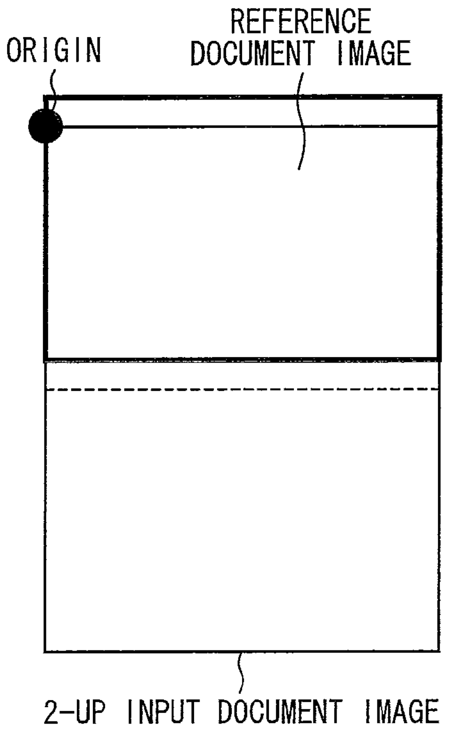
Figure 18:
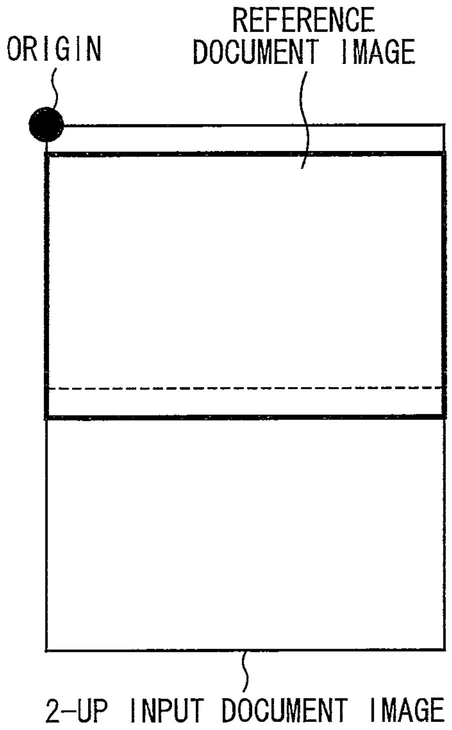

The reason why the minimum of A1' and that of B2' are set to −224 and −303, respectively is because when coordinates of the reference document image are transformed to coordinates of the input document image, the transformed coordinates may get out of the origin (0, 0) on the input document image, as illustrated in FIGS. 18(*a*) to 18(*d*). Furthermore, a value of the aforementioned fluctuation margin may be set so as to appropriately determine whether or not the input document is the 2-up document.

Moreover, in order to further improve discrimination accuracy, a configuration may be such that not only the coordinates at four corners after transformation are considered as mentioned above but also a ratio in size between the document images is further considered with use of the following equations:

$$\frac{|B1' - B2'|}{|a1 - a2|} = 0.7(\pm 0.05) \text{ and } \frac{|A1' - A2'|}{|b1 - b2|} = 0.7(\pm 0.05)$$

Figure 19:
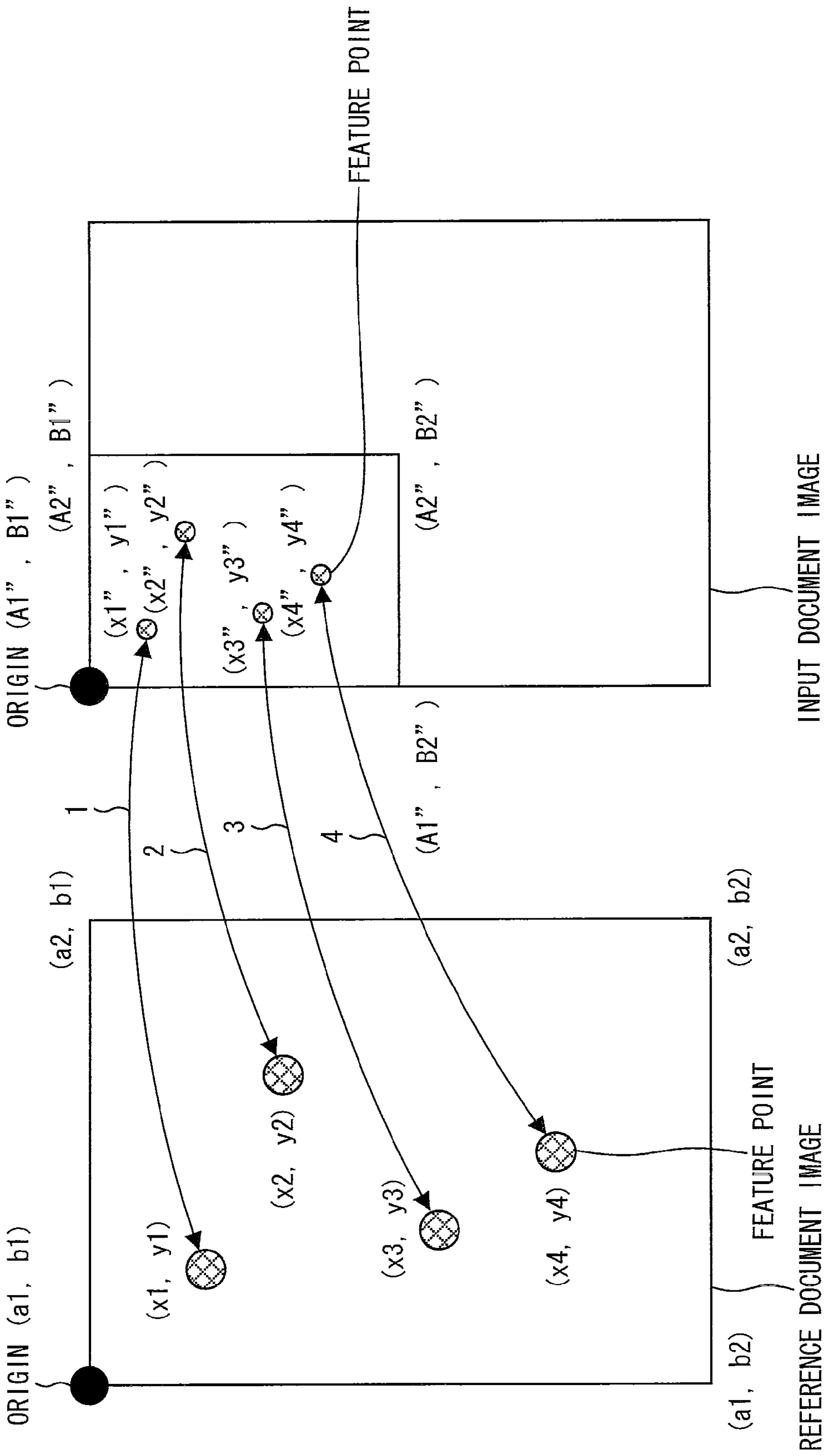
FIG. 19 is an explanatory diagram illustrating an image in which coordinates at four corners of the reference document image are transformed into coordinates on the input document image according to the transformation coefficient determined by the positions of the feature points which coincide in features (hash values), in case where the reference document image is similar to one of document images on a 4-up input document image.

2) As illustrated in FIG. 19, when coordinates at four corners of the reference document image and coordinates at four corners after transformation (coordinates on the input document image) are set to (a1,b1), (a2,b1), (a1,b2), (a2,b2) and (A1",B1"), (A2",B1"), (A1",B2"), (A2",B2"), respectively, and the coordinates after transformation satisfies the following expressions:

$$-112 \leqq A1'' \leqq 112,\ -151 \leqq B1'' \leqq 151,$$

$$2368 \leqq A2'' \leqq 2592,\ 3357 \leqq B1'' \leqq 3659,$$

the document discrimination process section 16 determines that input document image is an image of a 4-Up document.

In a case where (A1",B1") which is at the upper left of the document image is set to the origin (0,0), (A1",B2")=(0,7016/2), (A2",B2")=(4960/2, 7016/2), and (A2",B1")=(4960/2,0). For these values, there is set a coordinate fluctuation margin as a margin of ±2.5% of the number of pixels on the effective image region in horizontal and vertical directions.

Furthermore, in order to further improve discrimination accuracy, as in the case of the 2-up document, a ratio in size between the document image regions may be considered with use of the following equations:

$$\frac{|A1''-A2''|}{|a1-a2|}=0.5(\pm 0.025) \text{ and } \frac{|B1''-B2''|}{|b1-b2|}=0.5(\pm 0.025)$$

Figure 2:
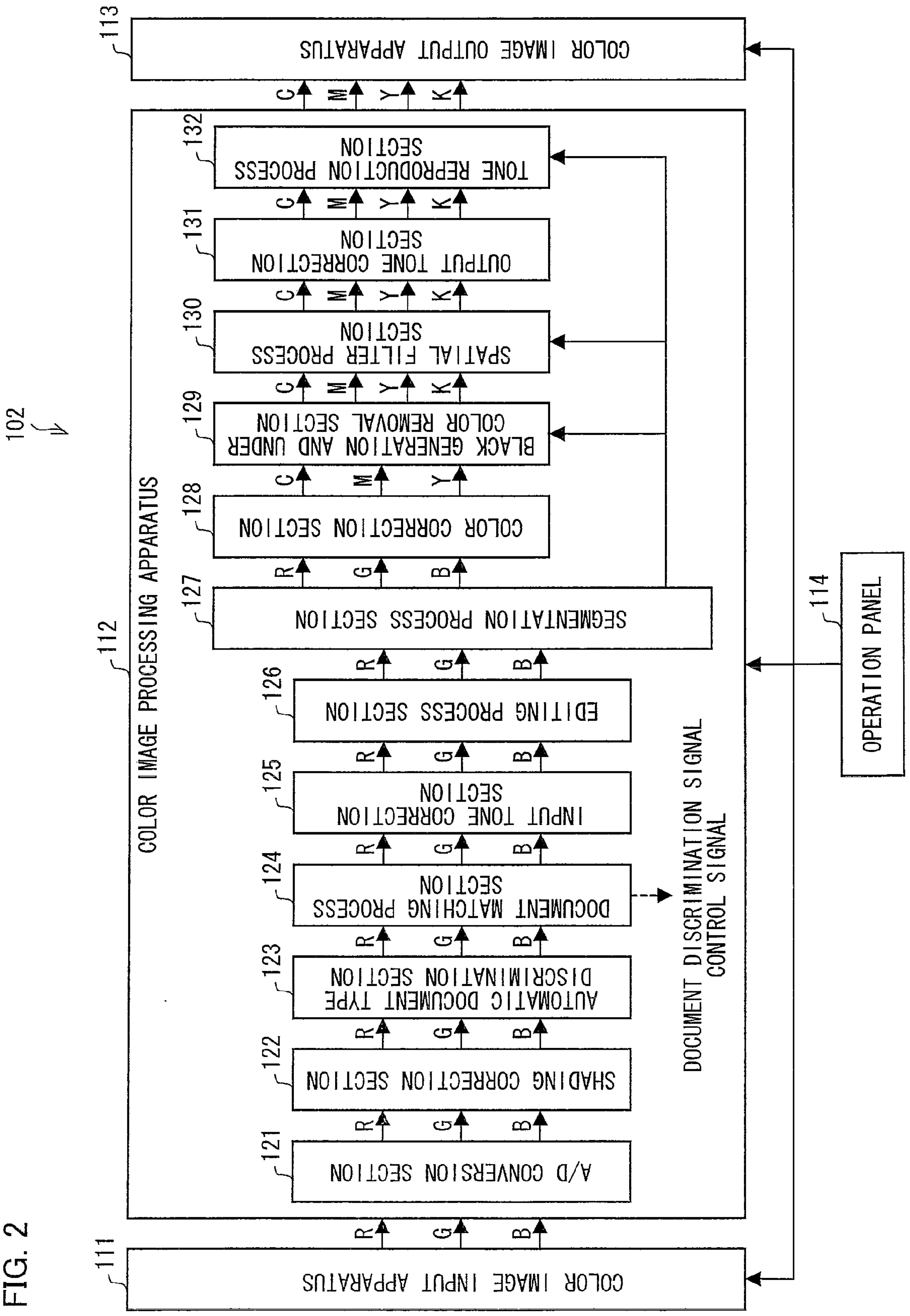
FIG. 2 is a block diagram illustrating a configuration of a digital color copying apparatus which is an image data output apparatus including the image matching device illustrated in FIG. 1.

In the case of the digital color copying apparatus (image data output apparatus) 102, the control signal and the document discrimination signal are inputted to an editing process section 126 in a color image processing apparatus 112 illustrated in FIG. 2.

In a case where the input document image is determined to be the image of the N-up document from the control signal and the document discrimination signal, and document images combined on the N-up document include what is similar to the reference document, the editing process section 126, in accordance with the control signal, applies, only to an image of a region which is on the input document image and similar to the reference document image, restrictions imposed for the reference document image (prohibition against copying, blanking out or blacking out of the document image (replacing a data value with "0" or "255 (in an eight-bit case)", or the like). The other image regions of the input document image are outputted as such without any restriction.

Figure 20:
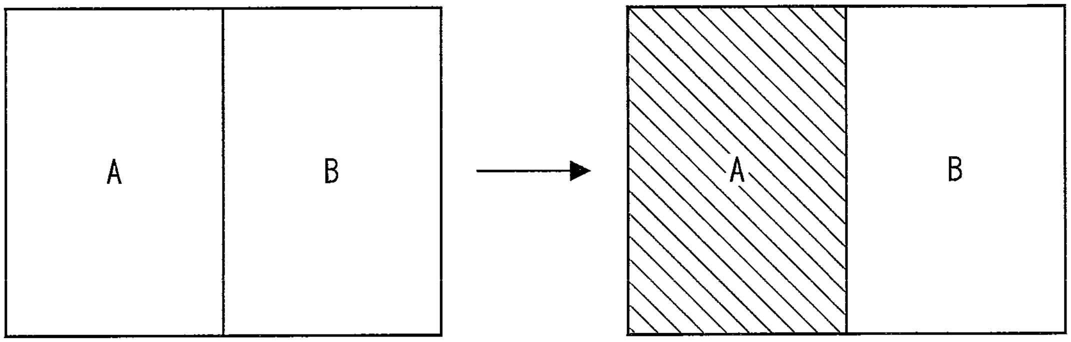
FIG. 20(*a*) and FIG. 20(*b*) are both explanatory diagrams illustrating an example of an output process (copying) performed in case where the input document image is an image of an N-up document and one of multiple document images combined thereon is similar to the reference document image.
Figure 20:
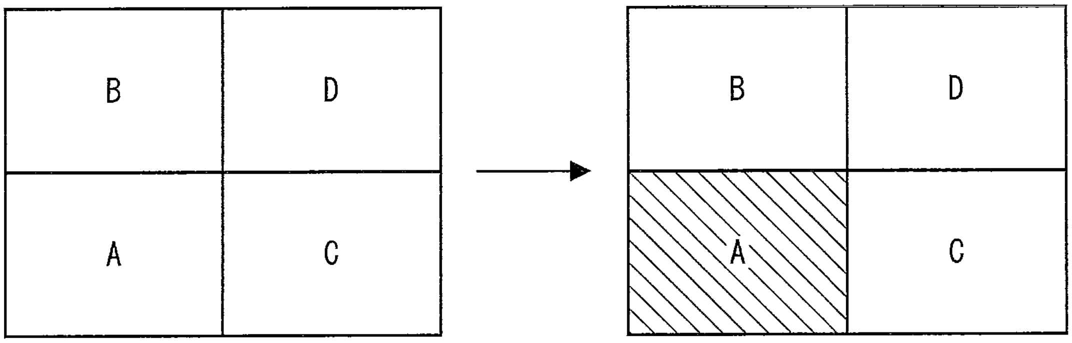

With this, as illustrated in FIG. 20(*a*) and FIG. 20(*b*), also in a case where the input document image is the 2-Up or 4-up document image, including a reference document image A which is prohibited from output, restrictions imposed only for the reference document image A are applied, and the other document images B, C, and D which are included in the input document image can be outputted with no problem.

The following describes a configuration of the digital color printing apparatus 102 including the image matching device 101. FIG. 2 is a block diagram illustrating a configuration of the digital color printing apparatus 102.

As illustrated in FIG. 2, the digital color printing apparatus 102 includes the color image input apparatus 111, the color image processing apparatus 112, the color image output apparatus 113, and an operation panel 114.

The color image input apparatus 111 is constituted by a scanner section including a device for converting optical information to an electric signal, such as CCD (Charge Coupled Device), or the like and outputs an image of light reflected from a document as an RGB analogue signal.

The analogue signal scanned by the color image input apparatus 111 is transmitted in the color image processing apparatus 112 from an A/D conversion section 121, a shading correction section 122, an automatic document type discrimination section 123, a document matching process section 124, an input tone correction section 125, the editing process section 126, a segmentation process section 127, a color correction section 128, a black generation and under color removal section 129, a spatial filter process section 130, an output tone correction section 131, and to a tone reproduction process section 132 in this order. The analogue signal is outputted to the color image output apparatus 113 as a CMYK digital color signal.

The A/D conversion section 121 converts an RGB signal from analogue to digital. By the shading correction section 122, the digital RGB signal transmitted from the A/D conversion section 121 is subjected to a process for removing various distortions produced in illumination, image focusing and image sensing systems of the color image input apparatus 111. Furthermore, the A/D conversion section 121 adjusts color balance and at the same time carries out a process for converting an RGB reflectance signal to a treatable signal, such as a density signal, which is adopted in the color image processing apparatus 112.

Based on the RGB signal (RGB density (pixel value) signal) whose various distortions are removed and whose color balance is adjusted by the shading correction section 122, the automatic document type discrimination section 123 carries out discrimination of a document type, that is, discriminates whether the scanned document is a text document, a printed photographic document, a text and printed photographic document in which a text and a printed photograph are mixed together, or the like.

The document matching process section 124 determines similarity between the inputted image data of the input document (input document image) and the previously-stored reference document images so as to output the control signal in accordance with a result of the determination. The document matching process section 124 also discriminates whether or not the input document is the N-up document and outputs the document discrimination signal. That is, the document matching process section 124 corresponds to the document matching process section 2 of the image matching device 101 illustrated in FIG. 1. In a case where the input document image is the image of the N-up document and part of the combined document images is similar to the reference document image, the image data of the input document image is outputted with such restrictions that only the image of the similar part is prohibited from being printed. Moreover, the document matching process section 124 outputs RGB data of the inputted image data to the input tone correction section 125 at a subsequent stage, without modifying the RGB data.

The input tone correction section 125 carries out image quality adjustment (removal of background density, contrast adjustment, etc.) on the RGB signal from which various distortions are removed by the shading correction section 122.

In a case where the input document image is the image of the N-up document and the document image similar to the reference document image is combined on the input document, the editing process section 126 carries out a process (e.g., prohibition against copying, blanking out or blacking out of the document image (replacing a data value with "0" or "255 (in an eight-bit case)") on the similar part of the document image so that the similar part of the document image will not be copied. In a case where no process is carried out on the N-up document, the process by the editing process section is "through" (not carried out).

The segmentation process section 127 segments pixels in the input image into any of a text region, a halftone dot region, and a photograph region from the RGB signal. In accordance with a result of the segmentation, the segmentation process section 127 outputs to the black generation and under color removal section 129, the spatial filter process section 130, and the tone reproduction process section 132, a segmentation class signal indicating to which region a pixel belongs. The segmentation process section 127 also passes the input signal from the editing process section 126 to the color correction section 128 at a subsequent stage without modifying the input signal.

In order to faithfully reproduce color, the color correction section 128 carries out a process for removing color impurity attributed to spectral characteristics of CMY color material containing an unnecessary absorption component.

The black generation and under color removal section 129 carries out a black generation process for generating a black (K) signal from a CMY three-color signal after color correction and a process for generating a new CMY signal by removing the K signal obtained by the black generation from the original CMY signal. With this, the CMY three-color signal is converted to a CMYK four-color signal.

In accordance with the segmentation class signal, the spatial filter process section 130 carries out a special filter process on image data of the CMYK signal with use of a digital filter, the image data of the CMYK signal being inputted from the black generation and under color removal section 129. In this way, the spatial filter process section 130 corrects spatial frequency characteristics. With this, a blur or granularity deterioration in an output image can be reduced.

In a similar manner to the spatial filter process section 130, the tone reproduction process section 132 carries out a predetermined process described later on the image data of the CMYK signal in accordance with the segmentation class signal.

For example, for a region segmented into a text by the segmentation process section 127, the spatial filter process section 130 strongly emphasizes (sharpens) a high frequency component in an edge enhancement process of the special filter process, in order to improve reproducibility of the text. At the same time, the tone reproduction process section 132 carries out a binarization or multi-level dithering process with a high-resolution screen which is suitable for reproduction of a high-frequency component.

Furthermore, on a region segmented into a halftone dot by the segmentation process section 127, the spatial filter process section 130 carries out a low-pass filter process for removing an input halftone dot component. The output tone correction section 131 carries out an output tone correction process for converting a signal, such as a density signal to a halftone dot area ratio which is a characteristic value of the color image output apparatus 113. Thereafter, an image is finally segmented into pixels by the tone reproduction process section 132, and then the image is subjected to a pixel-based tone reproduction process for reproducing each tone of the pixels. On a region segmented into a photograph by the segmentation process section 127, a binarization or multi-level dithering process is carried out with a screen suitable for tone reproduction.

Image data on which the aforementioned processes are carried out is temporarily stored in a storage (not illustrated). Thereafter, the image data is read out at a predetermined timing, so as to be inputted to the color image output apparatus 113.

This color image output apparatus 113 outputs image data on a recording medium, such as a sheet. Examples of the color image output apparatus may include electrophotographic and ink-jet color no-image output devices, but the color image output apparatus is not particularly limited thereto. Moreover, the aforementioned processes are controlled by a CPU (Central Processing Unit) (not illustrated).

Figure 21:
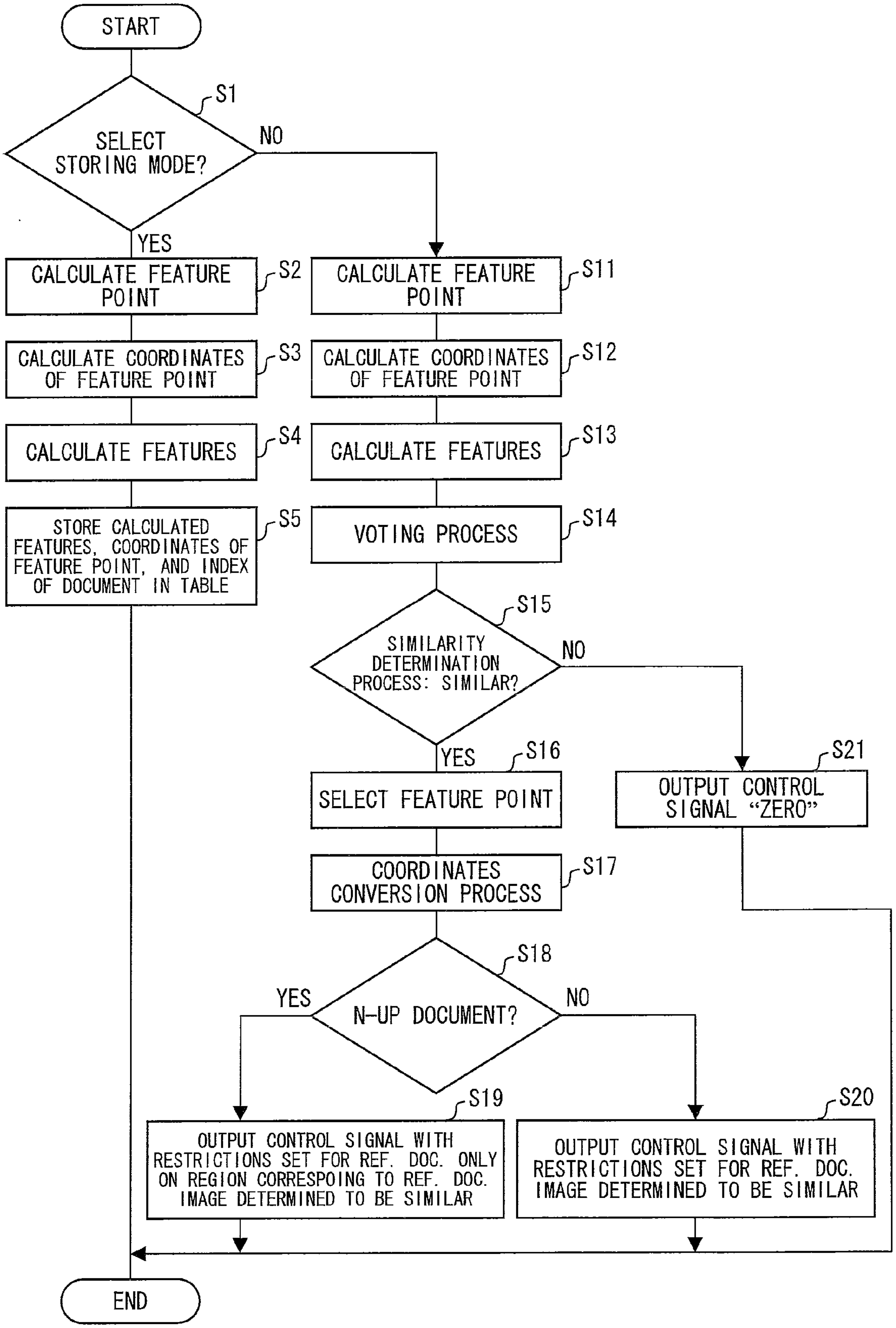
FIG. 21 is a flow chart illustrating operation in storage and matching modes in the image matching device illustrated in FIG. 1.

How the image matching device 101 of the present embodiment operates in the aforementioned configuration is described below with reference to a flow chart of FIG. 21.

First, the control section 1 determines whether or not a storing mode is selected (S1). In the digital color copying apparatus 102, the storing mode is selected by operation of the operation panel 114. Furthermore, in the image process system including the image apparatus 112 and a terminal device (computer) connected to the image apparatus 112, the storing mode is selected, for example, by input operation from the terminal device.

When the storing mode is selected, the feature point calculation section 11 calculates each feature point on the reference document image in accordance with the input image data (S2), thereafter calculating coordinates of the feature points (S3).

Next, the features calculation section 12 calculates features of each feature point calculated by the feature point calculation section 11 (S4). With respect to each of the aforementioned feature points on the document to be stored, the storage process section 15 stores the features (hash values) of the feature point, the index f of the feature point, coordinates of the feature point in the memory 3, and finishes the operation (S5). With this, a table illustrated in FIG. 14, which shows the index f indicating each feature point on the reference document and the coordinates on the image of the reference document, can be obtained.

On the other hand, when the storage mode is not selected, the control section 1 determines that a matching mode is selected. Accordingly, the operation proceeds to S11. At S11, the feature point calculation section 11 calculates each feature point on the input document image in accordance with the input image data, and further calculates coordinates of the feature points (S12).

Next, the features calculation section 12 calculates features of each feature point calculated by the feature point calculation section 11 (S13), and the voting process section 13 carries out the voting process with use of the calculated features of the object document (S14).

Next, the similarity determination section 14 determines whether or not the input document image is similar to any of the reference document images (S15). Here, in a case where the input document image is similar to none of the reference document images, the similarity determination section 14 outputs a determination signal "0" (S21), and finishes the operation.

On the other hand, when the input document image is similar to any of the reference images, the similarity determination section 14 selects feature points which coincide in features (S16), and determines the document transformation coefficient A of the reference document image around the input document image (S17).

Then, with use of the determined transformation coefficient A, coordinates of the reference document image are transformed into coordinates of the input document image, so that whether or not the input document image is the image of the N-up document is discriminated (S18).

When it is determined that the input document image is the image of the N-up document at S18, the control signal for carrying out the output process only on part of the input document image which is similar to the reference document image under restrictions imposed for the reference document image (S19), and the operation is finished.

On the other hand, when it is not determined that the input document image is the image of the N-up document at S18, the control signal for carrying out the output process on the whole input document image under restrictions imposed for the reference document image (S20), and the operation is finished.

As mentioned above, the image matching device 101 of the present embodiment calculates, from inputted image data of the input document, feature points of the input document image, determines features of the input document image in accordance with relative positions between the calculated feature points, and compares the determined features with features of the reference document image, so as to determine whether or not the input document image is similar to the reference document image. On the other hand, when the input document image is determined to be similar to the reference document image, the document discrimination process section 16, in accordance with each coordinate position of the feature points on the input document image and the feature points on the reference document image which coincides with the input document image in features, determines where on the input document image a position of the reference document image is located correspondingly, so as to discriminate whether or not the input document image is the image of the N-up document with use of information on the position.

With this, whether or not the input document is the N-up document can be discriminated by utilizing the function of the image matching process with use of the corelationship between the feature points on the input document image determined to match the reference document image and the feature points on the corresponding reference document image.

Figure 22:
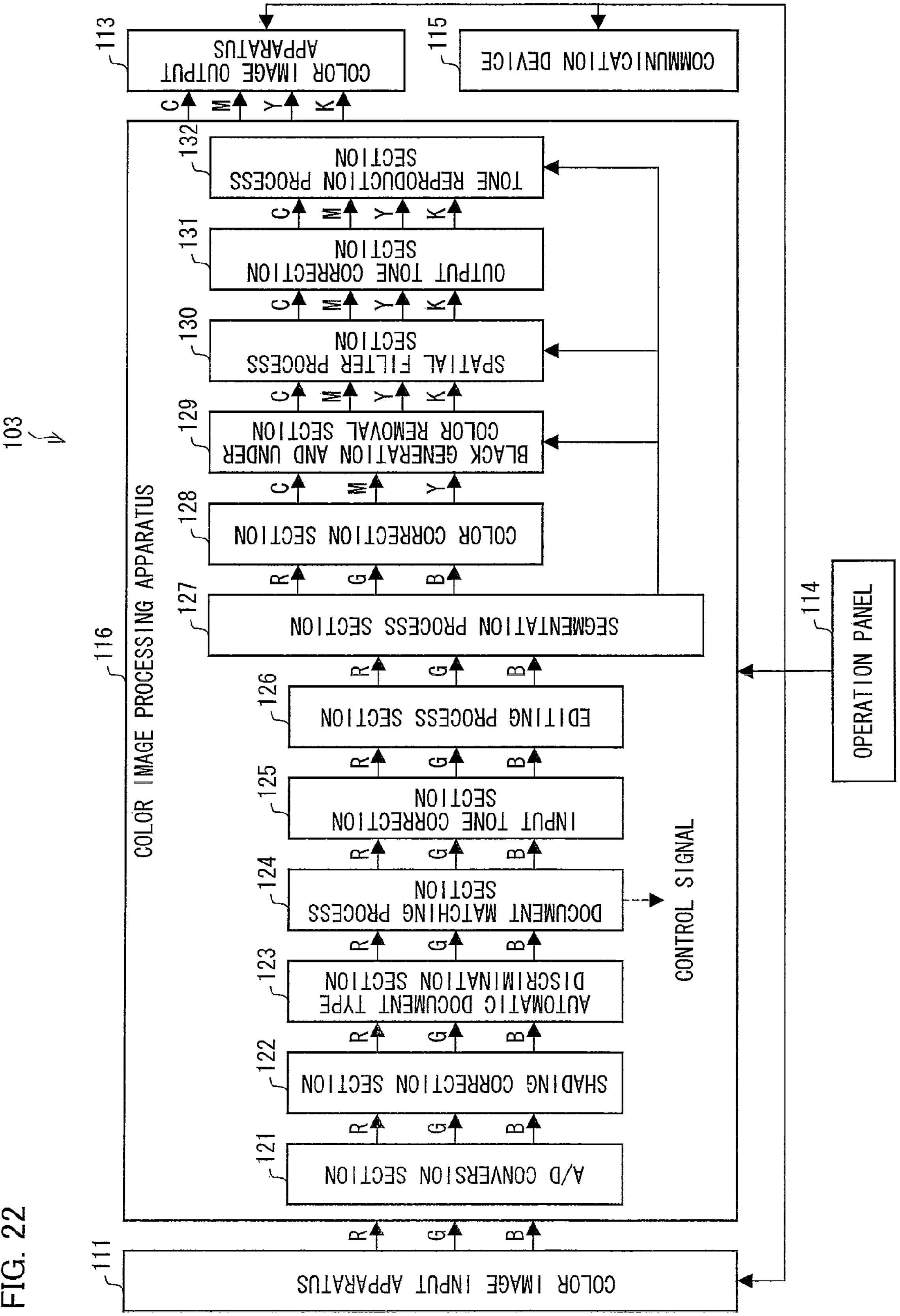
FIG. 22 is a block diagram illustrating a configuration of a digital color multiple function printer which is the image data output apparatus including the image matching device illustrated in FIG. 1.

FIG. 22 is a block diagram illustrating a configuration of a digital color multifunction printer (image data output apparatus) 103 including the image matching device 101 of the present embodiment.

The digital color multifunction printer 103 is arranged by adding a communication device 115 constituted by a modem, a network card, or the like to the digital color printing apparatus 102 illustrated in FIG. 2.

This digital color multifunction printer 103 performs facsimile transmission in such a manner that the communication device 115 carries out pre-transmission proceedings with a destination. When a transmittable state is secured, image data encoded in a predetermined manner (image data scanned by a scanner) is read out from the memory 3, and after a necessary process, such as conversion of a encoding format, the image data is sequentially transmitted to the destination via a communication line.

Moreover, in the case of facsimile reception, the digital color multifunction printer 103, while carrying out pre-communication proceedings, receives image data transmitted from an originating communication device and inputs the image data to a color image processing apparatus 116. In the color image processing apparatus 116, an encoding/decoding section (not illustrated) carries out a decoding process on the received image data. The decoded image data is subjected to a rotation apparatus a resolution conversion process, if necessary. Thereafter, output tone correction (by the output tone correction section 131) and tone reproduction process (by the tone reproduction process section 132) are carried out on the decoded image data, so that the decoded image data is outputted from the color image output apparatus 113.

Furthermore, the digital color multifunction printer 103 carries out data communication with a computer or another digital multifunction printer connected to a network via a network card and a LAN cable.

Moreover, the aforementioned example describes the digital color multifunction printer 103, but this multifunction printer may be a black and white multifunction printer or a stand-alone facsimile communication apparatus.

Figure 23:
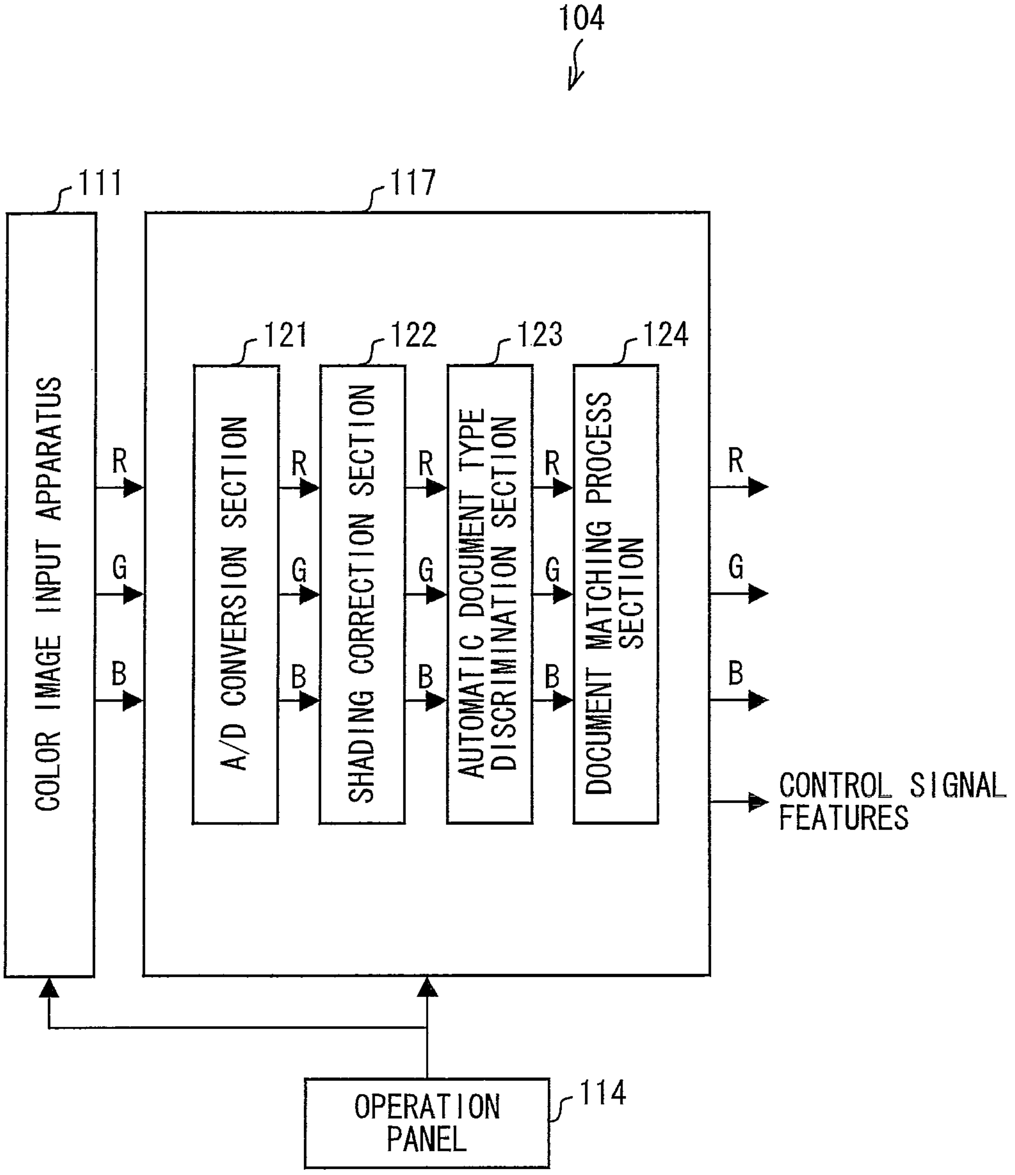
FIG. 23 is a block diagram illustrating a configuration of a color image scanner which is the image data output apparatus including the image matching device illustrated in FIG. 1.
Figure 24:
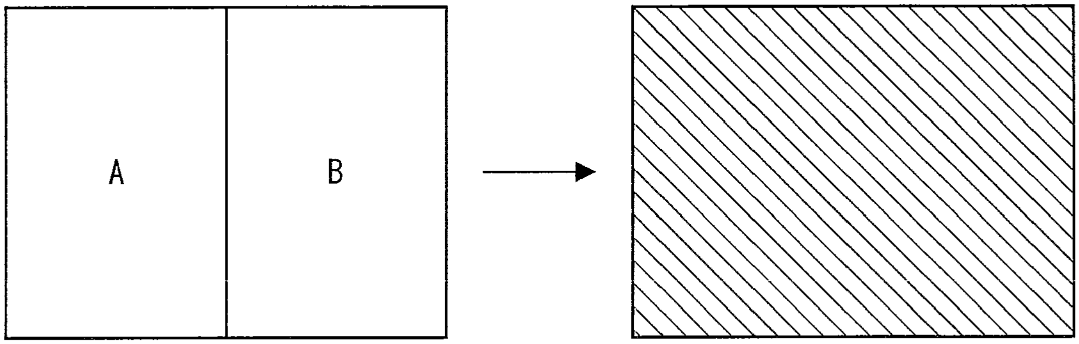
FIG. 24 is an explanatory diagram illustrating a problem in a conventional art and showing an example of the output process (copying) performed in case where the input document image is the image of the N-up document and one of the multiple document images combined thereon is similar to the reference document image.

Furthermore, the image matching device 101 of the present embodiment is also applicable to an image scanning device. FIG. 23 is a block diagram illustrating a configuration of a color image scanning device (image data output apparatus) 104. This color image scanning device 104 is, for example, a flat head scanner, or may be a digital camera.

The color image scanning device 104 includes the color image input apparatus 111 and a color image processing apparatus 117. The color image processing apparatus 117 includes the A/D conversion section 121, the shading correction section 122, the automatic document type discrimination section 123, and the document matching process section 124. The image matching section 124 corresponds to the document matching process section 2 in the image matching device 101 illustrated in FIG. 1.

The color image input apparatus 111 (image scanning means) is constituted by a scanning section including a CCD (Charge Coupled Device), for example. An image of light reflected from a document is scanned as an RGB (R: red ■ G: green ■ B: blue) analogue signal by the CCD. Thereafter, the analogue signal is inputted to the color image processing apparatus 117.

The analogue signal scanned by the color image input apparatus 111 is transmitted in the color image processing apparatus 117 from the A/D (analogue/digital) conversion section 121, the shading correction section 122, the automatic document type discrimination section 123, and to the document matching process section 124 in this order.

The A/D conversion section 121 converts an RGB analogue signal to a digital signal. The shading correction section 122 provides the digital RGB signal transmitted from the A/D conversion section 121 with a process for removing various distortions produced in illumination, image focusing and image sensing systems of the color image input apparatus 111. Furthermore, the A/D conversion section 121 adjusts color balance and also carries out a process for converting an RGB reflectance signal to a density signal.

The functions of the automatic document type discrimination section 123 and the document matching process section 124 are as mentioned above. The document matching process section 124 determines similarity between the inputted input document image and the reference document image. The document matching process section 124 outputs, in accordance with a result of the determination, the control signal (e.g., prohibition against copying, electronic distribution, or filing, or prohibition against electronic distribution to a predetermined address or filing in a predetermined folder. Or setting for filing in a predetermined folder or electronic distribution to a predetermined address is also possible.). Here, together with the scanned image data, the control signal is transmitted via a network to a printer or a multifunction printer, where the control signal is outputted. Or the control signal is inputted via a computer or directly to the printer. In this case, the printer, the multifunction printer, or the computer need to be set so as to determine a signal indicating process contents. A server, the computer, or the printer may also be set so as to carry out determination on matching of the input document image with the stored reference document image not by outputting the control signal but by outputting the calculated features of the input document image. A digital camera may also be used as the image scanning device.

Moreover, the aforementioned embodiments illustrate the configuration including the automatic document type discrimination section 123. However, a configuration in which the automatic document type discrimination section 123 is not provided is also possible.

The present invention may also be arranged such that an image process method for carrying out similarity determination (image matching) and output control as mentioned above is recorded on a computer-readable recording medium which records program codes of a program for allowing execution by a computer (an execution mode program, an intermediate code program, and a source program). This makes it possible to portably provide a recording medium which records a program code for practicing the image process method for carrying out similarity determination, output control, and the process for storing the document image.

Furthermore, in the present embodiment, as for this recording medium, a memory (not illustrated), such as a ROM itself may be a program medium since the process is carried out by a microcomputer. Moreover, a program medium may also be arranged such that a program scanning device is provided as an external storage device (not illustrated) and the program medium is scannable by inserting the recording medium to the program scanning device.

In any case, the stored program may be arranged to be executed by access of a microprocessor. Or in any case, such a mechanism is also possible that: a program code is read out; the read-out program code is downloaded in a program storage area of a microcomputer (not illustrated); and the program code is executed. This program for downloading is previously stored in the main device.

Here, the program medium is a recording medium which is arranged to be detachable from the main body. The program media may also be a medium fixedly bearing a program, including: (i) a tape, such as a magnetic or cassette tape; (ii) a disk, including a magnetic disk, such as a floppy (registered trademark) or hard disk, or an optical disk, such as a CD-ROM, MO, MD, or DVD; (iii) a card, such as an IC (including a memory card) or optical card; or (iv) a semiconductor memory by a mask ROM, EPROM (Erasable Programmable Read Only Memory), EEPROM (Electrically Erasable Programmable Read Only Memory), or flash ROM.

Moreover, in the present embodiment, the system is arranged to be connectable to a communication network, including the Internet and thus the system may also be a medium occasionally bearing a program so that a program code is downloaded from the communication network. Furthermore, in a case where the program code is downloaded from the communication network in such a manner, the program for downloading may be previously stored in the main device or may be installed from another recording medium. Further, the present invention can also be realized with an embodiment of a computer data signal in which the program code is realized by electronic transmission and which is embedded in carrier waves.

The recording medium is scanned by a program scanning device provided in a digital color image forming apparatus or a computer system, whereby the image process method is practiced.

Moreover, a computer system is constituted by: (i) an image input device, such as a flat head scanner, a film scanner, or a digital camera; (ii) a computer in which various processes, such as the image process method are carried out by a predetermined program being downloaded; (iii) an image display for displaying a result of the processes by the computer, such as a CRT display or a liquid crystal display; and (iv) a printer for outputting the result of the processes by the computer on a sheet or the like. The computer system is further provided with a network card or a modem as a communication means so as to be connected to a server or the like via a network.

The present invention is not limited to the description of the embodiments above, but may be altered by a skilled person within the scope of the claims. An embodiment based on a proper combination of technical means disclosed in different embodiments is encompassed in the technical scope of the present invention.

As mentioned above, the image matching device of the present invention is an image matching device comprising: a feature point calculation section for calculating feature points on an input document image from inputted data of the input document image; a features calculation section for calculating features of the input document image in accordance with a relative position between the feature points calculated by the feature point calculation section; a similarity determination section for determining whether or not the input document image is similar to the reference document image, the similarity determination section performing the determination by comparing (i) the features of the input document image which are calculated by the features calculation section with (ii) features of a reference document image; and a document discrimination section for discriminating whether or not the input document image is an image of an N-up document if the similarity determination section determines that the input document image is similar to the reference document image, the document discrimination section, in accordance with coordinate positions of feature points on the input document image and feature points on the reference document image which coincides with the input document image in features, determining where on the input document image a position of the reference document image is located correspondingly, and the document discrimination section discriminating whether or not the input document image is the image of the N-up document with use of information on where on the input document image the position of the reference document image is located correspondingly.

With this, whether or not the input document is the N-up document can be discriminated in the image matching process.

The image matching device of the present invention may also be arranged such that the document discrimination section comprises: a coefficient calculation section for calculating a coefficient if the similarity determination section determines that the input document image is similar to the reference document image, the coefficient indicating a positional relationship between the feature points on the input document image and the feature points on the reference document image which coincides with the input document image in features, and the coefficient calculation section calculating the coefficient in accordance with the coordinate positions of the feature points on the input document image and the feature points on the reference document image; and an N-up document determination section for determining whether or not the input document image is the image of the N-up document, the N-up document determination section performing the determination by transforming coordinates of reference points on the reference document image to coordinates on the input document image with use of the coefficient calculated by the coefficient calculation section, wherein the N-up document determination section determines that the input document image is the image of the N-up document, in a case where coordinate values of the transformed reference points meets predetermined requirements.

According to this, the coefficient calculation section, between the input document image and the reference document image which are determined to be similar by the similarity determination section, calculates the coefficient which indicates the positional relationship between the feature points on the input document image and the feature points on the reference document image in accordance with the coordinate positions of the feature points which coincide in features, and the N-up document determination section transforms the coordinates of the reference points on the reference document image to the coordinates on the input document image with use of the calculated coefficient, and determines that the input document image is the N-up document when the coordinate values of the transformed reference points meet predetermined requirements. For example, each point at four corners of the reference document image can be the reference point on the reference document image.

When the position on the coordinates of the input document image of the image similar to the reference document image is determined, the position can be easily and promptly determined with use of the reference points on the reference document image so as to transform the coordinates of the reference points on the reference document image to the coordinates on the input document image.

The image matching device of the present invention may also be arranged such that the document discrimination section comprises: a coefficient calculation section for calculating a coefficient if the similarity determination section determines that the input document image is similar to the reference document image, the coefficient indicating a positional relationship between the feature points on the input document image and the feature points on the reference document image which coincides with the input document image in features, and the coefficient calculation section calculating the coefficient in accordance with the coordinate positions of the feature points on the input document image and the feature points on the reference document image; and an N-up document determination section for determining whether or not the input document image is the image of the N-up document, the N-up document determination section performing the determination by transforming coordinates of reference points on the reference document image to coordinates on the input document image with use of the coefficient calculated by the coefficient calculation section, wherein the N-up document determination section determines that the input document image is the image of the N-up document, in a case where (i) coordinate values of the transformed reference points meets predetermined requirements and further, (ii) a result of comparison between a size of an image region on the reference document image, the size being determined from the coordinates of the reference points, and a size of an image region of a part which is on the input document image and similar to the reference document image, the size being determined from the values of the reference points transformed to the coordinates on the input document image, meets predetermined requirements.

In a case of the N-up document, as well as a position of each combined document image, a size of each document image is determined depending on requirements for combination. Accordingly, discrimination accuracy can be improved by discriminating whether or not the input document image is the image of the N-up document in consideration of a size of the image region of the image similar to the reference document image on the input document (a length ratio between horizontal and vertical scanning directions of the image region) in addition to the coordinate values of the reference points on the reference document image after coordinate transformation.

As mentioned above, the image data output apparatus of the present invention is an image data output apparatus for carrying out an output process on inputted data of an input document image, comprising: the image matching device of the present invention; and an output process control section for controlling the output process on the data of the input document image in accordance with a result of discrimination by the image matching device, the output process control section performing the output process individually for each combined document image in a case where the input document image is an image of an N-up document.

As already described as an image matching device, the image matching device of the present invention can discriminate whether or not the input document image is the image of the N-up document by utilizing the function of the image matching process. Accordingly, with the image data output apparatus of the present invention provided with such an image matching process, by arranging the output process control section so as to exercise control in accordance with each combined document image when the input document image is the image of the N-up document, the output process suitable for each combined document image can be carried out also when the input document image is the image of the N-up document.

As mentioned above, the image matching method of the present invention is a method for matching images, comprising: (a) calculating feature points on an input document image from inputted data of the input document image; (b) calculating features of the input document image in accordance with a relative position between the feature points calculated by the step (a); (c) determining whether or not the input document image is similar to the reference document image, by comparing (i) the features of the input document image which are calculated by the step (b) with (ii) features of a reference document image; and (d) discriminating whether or not the input document image is an image of an N-up document if it is determined in the step (c) that the input document image is similar to the reference document image, in the step (d), in accordance with coordinate positions of feature points on the input document image and feature points on the reference document image which coincides with the input document image in features, determining where on the input document image a position of the reference document image is located correspondingly, and discriminating whether or not the input document image is the image of the N-up document with use of information on where on the input document image the position of the reference document image is located correspondingly.

As already described as an image matching device, according to the aforementioned arrangement, whether or not the input document image is the image of the N-up document can be discriminated by utilizing the function of the image matching process.

Moreover, the image matching device can be realized by a computer. In this case, by operating a computer as each section mentioned above, a program for realizing the image matching device by a computer and a computer-readable recording medium recording the program are also encompassed in the scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An image matching device comprising:

a feature point calculation section for calculating feature points on an input document image from inputted data of the input document image;

a features calculation section for calculating features of the input document image in accordance with a relative position between the feature points calculated by the feature point calculation section;

a similarity determination section for determining whether or not the input document image is similar to the reference document image, the similarity determination section performing the determination by comparing (i) the features of the input document image which are calculated by the features calculation section with (ii) features of a reference document image; and a document discrimination section for discriminating whether or not the input document image is an image of an N-up document if the similarity determination section determines that the input document image is similar to the reference document image, the document discrimination section, in accordance with coordinate positions of feature points on the input document image and feature points on the reference document image which coincides with the input document image in features, determining where on the input document image a position of the reference document image is located correspondingly, and the document discrimination section discriminating whether or not the input document image is the image of the N-up document with use of information on where on the input document image the position of the reference document image is located correspondingly.

2. The image matching device as set forth in claim 1, wherein the document discrimination section comprises:

a coefficient calculation section for calculating a coefficient if the similarity determination section determines that the input document image is similar to the reference document image, the coefficient indicating a positional relationship between the feature points on the input document image and the feature points on the reference document image which coincides with the input document image in features, and the coefficient calculation section calculating the coefficient in accordance with the coordinate positions of the feature points on the input document image and the feature points on the reference document image; and an N-up document determination section for determining whether or not the input document image is the image of the N-up document, the N-up document determination section performing the determination by transforming coordinates of reference points on the reference document image to coordinates on the input document image with use of the coefficient calculated by the coefficient calculation section, wherein the N-up document determination section determines that the input document image is the image of the N-up document, in a case where coordinate values of the transformed reference points meets predetermined requirements.

3. The image matching device as set forth in claim 2, wherein the reference point on the reference document image is each point at four corners of the reference document image.

4. The image matching device as set forth in claim 1, wherein the document discrimination section comprises:

a coefficient calculation section for calculating a coefficient if the similarity determination section determines that the input document image is similar to the reference document image, the coefficient indicating a positional relationship between the feature points on the input document image and the feature points on the reference document image which coincides with the input document image in features, and the coefficient calculation section calculating the coefficient in accordance with the coordinate positions of the feature points on the input document image and the feature points on the reference document image; and an N-up document determination section for determining whether or not the input document image is the image of the N-up document, the N-up document determination section performing the determination by transforming coordinates of reference points on the reference document image to coordinates on the input document image with use of the coefficient calculated by the coefficient calculation section, wherein the N-up document determination section determines that the input document image is the image of the N-up document, in a case where (i) coordinate values of the transformed reference points meets predetermined requirements and further, (ii) a result of comparison between a size of an image region on the reference document image, the size being determined from the coordinates of the reference points, and a size of an image region of a part which is on the input document image and similar to the reference document image, the size being determined from the values of the reference points transformed to the coordinates on the input document image, meets predetermined requirements.

5. The image matching device as set forth in claim 4, wherein the reference point on the reference document image is each point at four corners of the reference document image.

6. An image data output apparatus for carrying out an output process on inputted data of an input document image, comprising:

an image matching device; and an output process control section for controlling the output process on the data of the input document image in accordance with a result of discrimination by the image matching device, the output process control section performing the output process individually for each combined document image in a case where the input document image is an image of an N-up document, and the image matching device comprising:

a feature point calculation section for calculating feature points on an input document image from inputted data of the input document image;

a features calculation section for calculating features of the input document image in accordance with a relative position between the feature points calculated by the feature point calculation section;

a similarity determination section for determining whether or not the input document image is similar to the reference document image, the similarity determination section performing the determination by comparing (i) the features of the input document image which are calculated by the features calculation section with (ii) features of a reference document image; and a document discrimination section for discriminating whether or not the input document image is an image of an N-up document if the similarity determination section determines that the input document image is similar to the reference document image, the document discrimination section, in accordance with coordinate positions of feature points on the input document image and feature points on the reference document image which coincides with the input document image in features, determining where on the input document image a position of the reference document image is located correspondingly, and the document discrimination section discriminating whether or not the input document image is the image of the N-up document with use of information on where on the input document image the position of the reference document image is located correspondingly.

7. A method for matching images, comprising:

(a) calculating feature points on an input document image from inputted data of the input document image;

(b) calculating features of the input document image in accordance with a relative position between the feature points calculated by the step (a);

(c) determining whether or not the input document image is similar to the reference document image, by comparing (i) the features of the input document image which are calculated by the step (b) with (ii) features of a reference document image; and (d) discriminating whether or not the input document image is an image of an N-up document if it is determined in the step (c) that the input document image is similar to the reference document image, in the step (d), in accordance with coordinate positions of feature points on the input document image and feature points on the reference document image which coincides with the input document image in features, determining where on the input document image a position of the reference document image is located correspondingly, and discriminating whether or not the input document image is the image of the N-up document with use of information on where on the input document image the position of the reference document image is located correspondingly.

8. A computer-readable recording medium which records a program for functioning a computer as each of the following sections of an image matching device comprising:

a feature point calculation section for calculating feature points on an input document image from inputted data of the input document image;

a features calculation section for calculating features of the input document image in accordance with a relative position between the feature points calculated by the feature point calculation section;

a similarity determination section for determining whether or not the input document image is similar to the reference document image, the similarity determination section performing the determination by comparing (i) the features of the input document image which are calculated by the features calculation section with (ii) features of a reference document image; and a document discrimination section for discriminating whether or not the input document image is an image of an N-up document if the similarity determination section determines that the input document image is similar to the reference document image, the document discrimination section, in accordance with coordinate positions of feature points on the input document image and feature points on the reference document image which coincides with the input document image in features, determining where on the input document image a position of the reference document image is located correspondingly, and the document discrimination section discriminating whether or not the input document image is the image of the N-up document with use of information on where on the input document image the position of the reference document image is located correspondingly.

* * * * *